(12) United States Patent
Daniels et al.

(10) Patent No.: US 12,228,221 B2
(45) Date of Patent: Feb. 18, 2025

(54) SEAL ASSEMBLY

(71) Applicant: Cummins Ltd, London (GB)

(72) Inventors: Robin Daniels, Huddersfield (GB); James Alexander McEwen, Huddersfield (GB); Levinia Mathews, Huddersfield (GB); Christopher Parry, Huddersfield (GB); Thomas Roberts, Huddersfield (GB); George E. Sandford, Huddersfield (GB); Stephen Caddy, Huddersfield (GB); Thomas Hulson, Leamington Spa (GB); Dave Lee, Shoreham-by-Sea (GB); Martin Selway, Shoreham-by-Sea (GB); Kevin Franks, Shoreham-by-Sea (GB); Lisa Jane Hill, Huddersfield (GB); Henry David Lambton Carr, Huddersfield (GB); Jonathan Wilson, Huddersfield (GB); Lee Curtis, Huddersfield (GB); Fahim Ismail Patel, Huddersfield (GB); Matthew Whittlesea, Huddersfield (GB); Matthew J. Purdey, Huddersfield (GB); Donald E. Willey, Huddersfield (GB)

(73) Assignee: Cummins Ltd, London (GB)

( * ) Notice: Subject to any disclaimer, the term of this patent is extended or adjusted under 35 U.S.C. 154(b) by 423 days.

(21) Appl. No.: 17/432,169

(22) PCT Filed: Feb. 21, 2020

(86) PCT No.: PCT/GB2020/050416
§ 371 (c)(1),
(2) Date: Aug. 19, 2021

(87) PCT Pub. No.: WO2020/169986
PCT Pub. Date: Aug. 27, 2020

(65) Prior Publication Data
US 2022/0186842 A1 Jun. 16, 2022

(30) Foreign Application Priority Data

Feb. 21, 2019 (GB) .................................. 1902347

(51) Int. Cl.
F16K 5/04 (2006.01)
F16J 15/44 (2006.01)
F04D 29/16 (2006.01)

(52) U.S. Cl.
CPC ............. *F16K 5/0471* (2013.01); *F16J 15/44* (2013.01); *F16K 5/0407* (2013.01); *F04D 29/162* (2013.01)

(58) Field of Classification Search
CPC .. F16K 11/0853; F16K 5/0471; F16K 5/0407; F16J 156/44; F04D 29/162; F02B 37/183; F02D 9/16
See application file for complete search history.

(56) References Cited

U.S. PATENT DOCUMENTS 3,011,522 A * 12/1961 Welsh ................. F16K 11/0853
137/625.46
5,823,740 A 10/1998 Cybularz et al.
(Continued)

FOREIGN PATENT DOCUMENTS

CN 201344261 Y 11/2009
CN 201739219 U 2/2011
(Continued)

OTHER PUBLICATIONS

CN201344261Y Machine Translation (Year: 2013).*
(Continued)

*Primary Examiner* — Michael R Reid
(74) *Attorney, Agent, or Firm* — Faegre Drinker Biddle & Reath LLP

(57) ABSTRACT

There is provided a seal assembly comprising: a first component and a second component spaced apart from the first
(Continued)

component so as to define a passage for the transfer of fluid from an inlet of the seal assembly to an outlet of the seal assembly, wherein the first component comprises a concavity at least partially defining the passage, and wherein no part of the second component extends into the portion of the passage bounded by the concavity.

29 Claims, 18 Drawing Sheets

(56) References Cited

U.S. PATENT DOCUMENTS

| | | | |
|---|---|---|---|
| 10,316,679 B2 * | 6/2019 | Nishikawa | F01D 9/02 |
| 11,578,645 B2 * | 2/2023 | Daniels | F02B 37/18 |
| 2012/0091662 A1 | 4/2012 | Neeli et al. | |
| 2013/0045086 A1 | 2/2013 | Stummer | |
| 2014/0147255 A1 | 5/2014 | Garrett et al. | |

FOREIGN PATENT DOCUMENTS

| | | |
|---|---|---|
| CN | 108397416 A | 8/2018 |
| EP | 2275644 A2 | 1/2011 |
| GB | 1161159 A | 8/1969 |
| SU | 1642164 A1 | 4/1991 |

OTHER PUBLICATIONS

GB Search Report for GB1902347.2, mailed Aug. 5, 2019.
International Search Report and Written Opinion issued by the European Patent Office, dated May 18, 2020, for International Application No. PCT/GB2020/050416; 14 pages.

* cited by examiner

SEAL ASSEMBLY

CROSS-REFERENCE TO RELATED APPLICATIONS

The present application is a national phase filing based on and claiming priority to PCT Application No. PCT/BG2020/050416, filed on Feb. 21, 2020, which claims priority to U.K. Application No. 1902347.2, filed on Feb. 21, 2019, the entire disclosures of which are expressly incorporated herein by reference.

FIELD OF THE DISCLOSURE

The present disclosure relates to a seal assembly, and in particular to a non-contact seal assembly which uses fluid vortices to impede the flow of fluid. The present disclosure further relates to a method of forming the same. Additionally, the present disclosure relates to control valve, an impeller assembly, a shaft assembly, and a variably geometry turbine having the seal assembly.

BACKGROUND

In machines which handle pressurised fluid, it is often desirable to minimise leakage between two relatively movable components; for example, between a shaft and a bush, or a piston and a cylinder, or the like. In some applications it is known to use contact seals to prevent leakage between the moving components. Contact seals typically comprise a sealing member which is placed between the two relatively moving components. During use, the sealing member is urged into contact with the two relatively moving components so that the sealing member forms a solid barrier therebetween. The presence of the sealing member restricts or prevents fluid from leaking out of the space between the two components. Examples of common sealing members for contact seals include O-rings and piston rings. However, because the sealing member physically engages the two components, when the two components are moved relative to one another friction will act on the interfaces between one or both of the two components and the sealing member, resulting in wear. When the sealing member becomes worn, its sealing effectiveness is reduced and therefore sealing members in contact seals often require replacement.

In some applications it may be desirable to avoid the use of contact seals. This may be, for example, because the sealing member may be placed in a position in which it is difficult to replace, or because wear of the sealing member would result in undesirable contamination of the fluid being sealed by the contact seal. In such applications it is known to provide a non-contact seal. Non-contact seals are seals which do not require physical contact between the two components desired to be sealed. It is normal for some fluid to leak between the two components in a non-contact seal, and therefore such non-contact seals are not "true" seals in that they do not entirely prevent fluid leakage. However, for many non-contact seals the amount of fluid that leaks past the seal is generally considered to be negligible in relation to the amount of fluid that is retained by the seal.

A labyrinth seal is a type of non-contact seal. Labyrinth seals are formed by creating a tortuous leakage path between two components that are desired to be sealed. The leakage path is defined by the relative geometries of the two components being sealed. Typically, in order make the leakage path "tortuous", the leakage path comprises a number of changes of direction. These changes of direction cause localised disruption to the fluid flowing along the leakage path and thereby create resistance to fluid flow. Furthermore, the distance between the components desired to be sealed is typically relatively small, such that even "flat" sections of the leakage path will cause resistance to flow due to high frictional forces (sometimes referred to as "pipe friction"). The resistance to leakage provided by the labyrinth seal may be enough to bring the overall rate of fluid leakage between the two components to acceptable levels, without providing a solid barrier between the two components.

In order to provide a tortuous path, typically the two components forming the labyrinth seal must overlap one another to some extent. This overlap will cause movement of the components relative to one another to be constrained, such that freedom of movement between the two components is limited. For example, where the components are a shaft and a bush, the shaft may comprise one or more circumferential splines which are received within circumferential grooves of the bush. The overlap between the splines and the grooves means that although the shaft can rotate relative to the bush, axial movement of the shaft relative to the bush is restricted. Furthermore, any axial forces transmitted along the shaft may cause the splines of the shaft to bind against the grooves of the bush, thus causing resistance to rotation and damage to the shaft and the bush. As such, in non-contact seals it is often necessary to precisely control the axial position of the shaft relative to the bush, increasing the complexity of the seal assembly.

It is an object of the present disclosure to obviate or mitigate one or more problems associated with known seal assemblies, whether identified herein or elsewhere. It is a further object of the disclosure to provide an alternative seal assembly and/or method of sealing.

Turbines are well known devices for converting the kinetic energy within a flowing gas into useful work. In particular, known turbines convert the kinetic energy of flowing gas into rotation of a rotor (or turbine wheel) of the turbine. The rotation of the rotor may be transmitted by a suitable linkage to any device suitable for doing useful work. Examples of such device include a power generator (such that the turbine forms part of a power turbine) and a compressor (such that the turbine forms part of a turbocharger).

As is well known in the art, turbochargers function by their turbine receiving exhaust gas from an internal combustion engine and consequently rotating a turbine wheel of the turbocharger so as to drive a compressor wheel for rotation. The compressor wheel draws in gas and pressurises it so that the gas output by the compressor is at an elevated pressure (or boost pressure) as compared to that at the inlet of the compressor. The output of the compressor of the turbocharger (i.e. the gas at boost pressure) can be fed to an inlet of the internal combustion engine of which the turbocharger forms part.

In some applications, a turbine bypass valve may be required to enable exhaust gas produced by the engine to which the turbine is attached to bypass the turbine so it flows to a downstream component of the engine system, such as an exhaust aftertreatment system, without passing through the turbine. Typically, such bypass valves are provided as poppet or flap-type valves. However, it is also known to provide the bypass valve as a rotary-type valve. Such rotary valves comprise a body defining a main conduit for transferring fluid between an inlet of the valve and a first outlet of the valve. The body further defines a generally cylindrical valve chamber extending transversely to the direction of flow through the main conduit, and a second outlet fluidly connected to the cylindrical bore. The first outlet delivers fluid to the inlet of the turbine, and the second outlet defines a bypass passage that delivers fluid directly to the outlet of the turbine, bypassing the turbine wheel. The rotary valve further comprises a valve member supported for rotation about a longitudinal axis of the valve chamber. The valve member typically comprises one or more channels extending along a chord of the valve member from one side of the valve member to the other so that fluid can be transferred from the inlet to the first and/or second outlet.

It has been found that during use some exhaust gas may leak around the outside of the valve member. This is detrimental to the performance of the turbine, for example where exhaust gas leaks into the bypass passage during operating conditions where no bypassing is required. As such, not all of the exhaust gas passes through the turbine wheel and therefore the efficiency of the turbine during "no bypass" operating conditions is reduced.

It is therefore a further object of the disclosure to obviate or mitigate disadvantages of rotary valves, and in particular rotary valves for use with a turbine, whether identified herein or elsewhere. It is a further object of the disclosure to provide an alternative rotary valve.

SUMMARY

According to a first aspect of the disclosure, there is provided a seal assembly comprising: a first component and a second component spaced apart from the first component so as to define a passage for the transfer of fluid from an inlet of the seal assembly to an outlet of the seal assembly, wherein the first component comprises a concavity at least partially defining the passage, and wherein no part of the second component extends into the portion of the passage bounded by the concavity.

By "concavity" it is meant substantially any concave geometry formed on the surface of a component. The concavity is configured to generate vortices in a fluid flowing in the passage, for example a fluid flowing from the inlet of the seal assembly to the outlet of the seal assembly. In the region of the concavity, the width of the passage is enlarged for a portion of the overall length of the passage. As the passage widens, the Reynolds number of the flow increases which leads to turbulent flow. The presence of the concavity therefore generates turbulence in the fluid flowing through the seal assembly. The turbulent fluid in the concavity will form vortices causing the fluid to lose energy due to friction. Furthermore, because vortices are low pressure, the vortices draw in passing fluid, causing the fluid to take a wandering path as it traverses the concavity. The presence of vortices in the flow therefore impedes the overall flow rate of fluid through the seal assembly, creating a resistance to leakage of fluid through the passage. Because the resistance to flow through the passage is created by vortices, no contact seals are required to seal between the first and second components. As such, the seal assembly may be described as a non-contact seal assembly.

By "the portion of the passage bounded by the concavity", it is meant the volume of free space defined by the geometry of the concavity itself. Put another way, "the portion of the passage bounded by the concavity" may be defined between the portion of the first component defining the concavity and an imaginary surface of the first component which extends over the concavity and which would be present if the concavity was not there. For example, if the concavity is a hemispherical indentation formed by the first component, the portion of the passage bounded by the hemispherical indentation is the region of space defined by the hemisphere itself. In particular, no part of the second component is present within the hemisphere and no part of the second component may pass into the hemisphere from outside of the hemisphere. It will be appreciated that any intermediate components placed between the first and second components may be treated as defining part of the first or second component. For example, a seal assembly having an intermediate component placed between the first and second components will form part of the first aspect of the disclosure if the intermediate component does not extend into the concavity defined by the first component. In such cases the intermediate component may be considered to be the second component in its own right, or may be considered to form a constituent part of the second component.

It will be appreciated that some of the fluid must pass out of the exit of the seal assembly in order for turbulent flow to occur. As such, the seal assembly permits an amount of leakage. However, the amount of leakage permitted by the seal assembly is typically negligible in comparison to the volume of fluid being contained by the seal assembly and therefore the seal assembly can be said to function as a seal.

The first component and the second component may be movable relative to one another. Because no part of the second component extends into the portion of the passage bounded by the concavity, the first and second components exhibit greater freedom of movement relative to one another. For example, if the first and second components are plates, they will be able to move in any direction in the plane defined between the plates whilst still providing adequate sealing. Likewise, if the first component is housing comprising a cylindrical bore and the second component is a shaft received within the bore, the second component will be able to move both rotationally and axially with respect to the bore whilst maintaining adequate sealing. Put another way, the first and second components exhibit multiple degrees of freedom therebetween. By contrast, labyrinth seals rely on the creation of a tortuous path in which one portion of the labyrinth seal assembly overlaps in two or more directions with another portion of the labyrinth seal assembly, thus restricting the relative movement between the components of the labyrinth seal assembly to a single degree of freedom.

The seal assembly may define a direction of fluid flow from the inlet to the outlet, and wherein the first and second components may be moveable relative to one another generally parallel to the direction of fluid flow. By "movable relative to one another generally parallel to the direction of fluid flow" it is meant that the first component and/or the second component can move in the direction of fluid flow or against the direction of fluid flow. For example, the first component may be a tubular housing and the second component may be a valve member supported for rotation within the tubular housing. The direction of fluid flow may be circumferentially around an outside of the valve member, between the valve member and the tubular housing. Because the valve member (i.e. the second component) does not extend into the concavity of the tubular housing (i.e. the first component), the valve member is free to rotate within the tubular housing. As such, the seal assembly is particularly suited to applications where the first and second components must move relative to one another in or against the direction of leakage. It will be appreciated that "parallel" movement encompasses both movement in a common direction within a plane and movement in a common direction around an axis.

The concavity may define a depth and the first and second components may define a clearance, and the ratio of the depth of the concavity to the clearance between the first and second components may be in the range of around 2.5:1 to around 3.75:1 or preferably be at least around 3:1. The ratio of the maximum depth of the concavity to the minimum clearance between the first and second components may be at most around 15:1, around 8:1 or around 5:1, and/or may be at least around 4:1. The depth of the concavity is intended to encompass the depth of the concavity at its deepest point. That is to say, the distance between the most recessed part of the concavity and the surface of the first component defining the remainder of the passage. The depth of the concavity may be the maximum depth of the concavity. The clearance between the first and second components is intended to encompass the distance between the first and second components at the point where they are closest together. The clearance may be a minimum clearance between the first and second components. The range of ratios given above may apply equally to a concavity defined by the second component, and to any additional concavities defined by the first and/or second components.

The concavity may define an elongate recess. That is to say, the recess may define a length and a width orthogonal to the length, and the length of the recess maybe generally longer than the width of the recess. Furthermore, the first component may define a length and the recess may extend along at least a portion of the length of the second component. Where the concavity is an elongate recess, turbulent flow is generated along the entire length of the concavity. As such, it is more difficult for the fluid to flow from the inlet to the outlet without passing through the concavity. That is to say, the chance that the fluid may pass around the outside of the concavity is reduced. As such, more of the leaked fluid will experience resistance to fluid flow and thus sealing is improved. Alternatively, the recess may extend the entire length of the second component. In this case, all of the fluid traversing the passage must pass through the concavity before it reaches the exit of the seal assembly. As such, all of the leaked fluid will experience resistance to fluid flow and thus sealing is improved. The recess may define a generally straight path, or the recess may comprise one or more bends such that the recess defines a curved path. For example, the path of the recess may be sinusoidal or zigzagged.

The concavity may define a generally semi-circular cross-section. Where the second component comprises a concavity, the concavity of the second component may also define a semi-circular cross-section. Furthermore, where the first and/or second component comprises a plurality of concavities, each concavity of the plurality of concavities may define a semi-circular cross-section. It will be appreciated that, because the concavity is semi-circular, at the point at which the concavity joins the passage the angle of the concavity relative to the passage is approximately 90°. The angle between the passage and the concavity is sharp, which causes the flow entering the concavity to trip, thus encouraging vortex formation and causing increased resistance to fluid flow.

The concavity may define an asymmetric cross-section. By "asymmetric cross-section" it is meant any cross-sectional shape which is non-symmetrical with respect to a central point or longitudinal centreline. Examples of asymmetric cross-sections include scooped and saw-tooth profiles.

The passage may define a length, and the ratio of the length of the passage to the depth of the concavity may be at least around 20:1. It has been found that where the length of the passage is at least 20 times the depth of the concavity, this provides improved sealing.

The concavity may define a surface roughness in the range of around 10 μm to around 50 μm. Preferably the surface roughness may be around 25 μm.

The concavity may smoothly transition between a minimum depth and a maximum depth. By "smoothly transition" it is meant that the geometry of the concavity varies in a manner which does not comprise steps, sharp corners or edges. As such, the geometry of the concavity will be at least partially curved.

The first component may comprise a plurality of concavities at least partially defining the passage. Each concavity is able to cause vortices which act to impede flow through the seal assembly. Because the first component comprises a plurality of concavities, the quantity of turbulent flow comprising vortices is increased and therefore the seal assembly exhibits increased resistance to flow. The first component may comprise at least five concavities.

The concavities may be arranged in series between the inlet of the seal assembly and the outlet of the seal assembly. By "arranged in series" it is meant that as the flow passes through the seal assembly from the inlet to the outlet, the flow will pass each of the plurality of concavities in turn, one after the other. Each of the concavities will have the effect of producing an amount of turbulent flow which will act to resist flow through the passage. As such, because the concavities are arranged in series, the flow will pass through multiple cavities. The cumulative effect of the turbulence produce by each concavity increases the overall resistance to flow through the seal assembly.

Each concavity may define a width in a direction from the inlet to the outlet, and the widths of the concavities may be approximately equal. That is to say, each concavity may define a width in a lateral direction, and the width of the concavities may be approximately the same. The widths of the concavities of the first component may be approximately the same as each other and may further be the same as the widths of any concavities of the second component.

Each concavity may define a centre, and the centres of the concavities may be spaced apart from one another by at least approximately twice the width of the concavities. That is to say, where the first and/or second component comprises a plurality of concavities, the concavities may be spaced apart from one another by at least approximately twice the width of the concavities. As such, for a pair of concavities having approximately the same width, the centres of the concavities will be spaced apart by at least approximately twice the width of the concavities.

The plurality of concavities may comprise a plurality of dimples. That is to say, each concavity of the plurality of first concavities may be a dimple. By "dimple" it is meant an indentation having a width and a length that are approximately the same. The dimples will create turbulent flow that will act to restrict flow through the passage.

Each of the plurality of concavities may define a depth, and the depths of two or more adjacent concavities may be different. That is to say, where the first component comprises a plurality of concavities, the concavities of the first component may be different sizes relative to one another. It will be appreciated that the different sizes of concavities are able to produce turbulence over different ranges of flow conditions, and therefore the range of flow conditions over which the seal assembly produces turbulence is increased. Where the second component comprises a plurality of concavities, a first concavity of the plurality of concavities of the second component may define a first depth, and a second concavity of the plurality of concavities of the second component may define a second depth, and the first depth may be greater than the second depth.

The second component may comprise a concavity at least partially defining the passage, and the seal assembly may be arranged such that no part of the first component extends into the portion of the passage bounded by the concavity of the second component. Because both the first and second components comprise concavities, both the first and second components are able to cause the formation of vortices. Furthermore, because the first component does not extend into the concavity of the second component and vice versa, the first and second components are able to move relative to one another in multiple different directions and therefore exhibit greater freedom of movement. It will be appreciated that because the first and second components are movable relative to one another the concavities of the first and second components may be positioned so that they are aligned with one another, are misaligned with one another, or at least partially overlap with one another. When the concavities are aligned, this results in the formation of a relatively large chamber between the first and second components. Because the chamber is relatively large, the chamber will cause the Reynolds number of the fluid to increase by a relatively large amount, and thus the flow is more likely to become turbulent. However, when the concavities are misaligned or overlapped the presence of the concavities will still produce turbulent flow, and therefore good sealing can be provided regardless of the relative alignment of the first and second components. Furthermore, because no part of the first component extends into the concavity of the second component this means that the first and second components are free to move relative to one another generally towards and against the direction of fluid flow through the seal assembly.

It will be appreciated that the concavity of the second component may have the same or similar geometry as the concavity of the first component or the plurality of concavities of the first component. That is to say, the concavity of the second component may have any of the optional features discussed above in relation to the concavity of the first component.

The concavity of the first component may define a first depth and the concavity of the second component may define a second depth, and the first depth may be different to the second depth.

By "depth" it is meant a dimension of the concavity orthogonal to the overall direction of flow. For example, if the first and second components are generally flat plates, the depth of each concavity is the dimension of the concavity along an axis normal to the plane defined by the plates. Because the depth of the concavity of the first component is different than the depth of the concavity of the second component, the relative volume of the two concavities will also be different. This is advantageous where, for example, the combined size of the two concavities must be a certain volume, however spatial constraints prevent the two concavities from being made the same size.

The second component may comprise a plurality of concavities at least partially defining the passage. Because the second component also comprises a plurality of concavities, the quantity of turbulent flow is further increased and the seal assembly exhibits increased resistance to flow.

It will be appreciated that the plurality of concavities of the second component may have the same arrangement as the plurality of concavities of the first component. That is to say, the plurality of concavities of the second component may have any of the optional features discussed above in relation to the plurality of concavities of the first component. For example, the widths of the second concavities may be the same as the widths of the first concavities. Alternatively, the widths of the second concavities may be different to the widths of the first concavities.

According to a second aspect of the disclosure there is provided a valve comprising: a housing defining a valve chamber defining a longitudinal axis, an inlet adjoining the valve chamber, a primary outlet adjoining the valve chamber, and; a valve member disposed within the valve chamber and supported for rotation about a longitudinal axis of the valve chamber, the valve member and the housing defining a clearance therebetween; and a seal assembly according to the first aspect of the disclosure, wherein: the housing comprises one of the first component of the seal assembly and the second component of the seal assembly, the valve member comprises the other of the first component of the seal assembly and the second component of the seal assembly, and the clearance comprises the passage of the seal assembly.

That is to say, the housing may comprise the first component and the valve member may comprise the second component, or the housing may comprise the second component and the valve member may comprise the first component. By "comprise" it will be appreciated that the housing may be partially or wholly composed of one of the first and the second component, and the valve member may be partially or wholly composed of the other of the first component and the second component. Likewise, the clearance may be partially or wholly composed of the passage of the seal assembly. As such, the housing and/or the valve member may comprise one or more concavities. By "clearance" it is meant a region of space between the housing and the valve member which separates the housing from the valve member so that the valve member is free to rotate relative to the housing.

It will be appreciated that the concavity (or concavities) of the housing and/or the valve member are configured to cause the formation of vortices in any fluid passing through the clearance. The presence of the vortices will impede the flow of fluid through the clearance, thus reducing leakage through the clearance. This is particularly advantageous where the valve member is used to block one or both of the primary and secondary outlets, because leakage of fluid from the inlet to the primary and/or secondary outlet via the clearance between the housing and the valve member will be reduced without the need for a contact seal. Furthermore, it will be appreciated that in such embodiments no part of the housing will extend into a concavity of the valve member and no part of the valve member will extend into a concavity of the housing. As such, the valve member is able to rotate freely within the valve chamber.

The valve may further comprise a secondary outlet adjoining the valve chamber. The valve member my therefore be used to selectively control which of the primary and secondary outlets the fluid is able to pass into. In one embodiment, the inlet may be connected to a source of exhaust gas, the primary outlet may be connected to a turbine inlet, and the secondary outlet may be connected to a bypass passage that delivers exhaust gas to a position downstream of a turbine inlet. The valve member may be used to selectively open or close the secondary outlet, so as to control the amount of exhaust gas that is able to bypass the turbine. The turbine may be part of a turbocharger.

The valve member may comprise: a first end wall positioned at a first longitudinal end of the valve member, a second end wall positioned at a second longitudinal end of the valve member opposite the first end of the valve member, and a web extending between the first and second end walls. In such embodiments, the web may be use to selectively block one or both of the primary and secondary outlets of the housing.

The first end wall may be received by a first end cap having a first longitudinally extending shaft, and wherein the second end wall may be received by a second end cap having a second longitudinally extending shaft. The shafts may be aligned with the longitudinal axis of the housing and additionally may be configured to support the valve member for rotation within the valve chamber. The end caps may therefore support the valve member for rotation within the valve chamber.

The web may comprise the first component, and the concavity of the first component may be defined by an outer surface of the web. For example, the web may comprise one or more longitudinally extending recesses formed on the outer surface of the web. The longitudinally extending recesses of the web will cause vortices to be formed in the clearance between the valve member and the housing (or the sleeve) and hence impede fluid flow around the outside of the valve member.

The housing may comprise a sleeve and the sleeve may comprise the first component. The sleeve may be the first component. The sleeve can be manufactured separately to the housing. The sleeve will be relatively small compared to the housing, and therefore it is easier to control the geometry (i.e. tolerances) of the sleeve as compared to the housing. As such, providing the first component as a sleeve makes the valve cheaper to manufacture. The sleeve may be considered to be part of the housing. The concavity may be formed on an inner surface of the sleeve. The sleeve may comprise one or more longitudinally extending recesses defining the concavity.

The valve member may comprise an inner housing between the housing and the sleeve. The inner housing and the valve member may at least partially define a cartridge received by the housing. In such embodiments, because the valve member and the inner housing form a cartridge, it is easier to control the geometry (i.e. tolerances) of the inner housing, the valve member and the sleeve separately to the housing of the valve. As such, the valve is cheaper and easier to make.

The inlet, the primary outlet and the secondary outlet may define a plane. The longitudinal axis may extend transverse to plane. The valve may be a rotary turbine control valve for use with a turbine.

According to a third aspect of the disclosure there is provided a turbine system comprising: a turbine having a turbine housing and a turbine wheel; a bypass passage; and a valve according to any the second aspect of the disclosure; wherein the primary outlet of the valve is in fluid communication with an inlet of the turbine housing and the secondary outlet of the valve is in fluid communication with the bypass passage, and wherein the bypass passage is further in fluid communication with an outlet of the turbine housing.

Rotation of the valve member will cause the valve member to block or unblock the bypass passage so as to control the fluid flow from the inlet of the valve to the turbine wheel and/or the bypass passage. However, because the valve comprises the seal assembly of the first aspect of the disclosure, fluid leakage around the valve member between the valve member and the housing is reduced. The seal assembly of the first aspect of the disclosure is particularly suited to such an application because it exhibits greater freedom of movement due to the fact that no part of the first and/or second component of the seal assembly extends into a concavity defined by the other of the first and/or second component.

According to a fourth aspect of the disclosure there is provide a turbine comprising a valve according to the second aspect of the disclosure. The turbine may comprise a turbine housing. The turbine housing may define the housing of the valve. Such a turbine may comprise: a turbine housing defining a valve chamber defining a longitudinal axis, an inlet adjoining the valve chamber, a primary outlet adjoining the valve chamber, and; a valve member disposed within the valve chamber and supported for rotation about a longitudinal axis of the valve chamber, the valve member and the turbine housing defining a clearance therebetween; and a seal assembly according to the first aspect of the disclosure, wherein: the turbine housing comprises one of the first component of the seal assembly and the second component of the seal assembly, the valve member comprises the other of the first component of the seal assembly and the second component of the seal assembly, and the clearance comprises the passage of the seal assembly. The turbine and/or the turbine housing may form part of a turbine system.

According to a fifth aspect of the disclosure there is provide an impeller assembly for a turbocharger, the impeller assembly comprising: a housing defining a volute; an impeller wheel positioned within the housing and supported for rotation relative to the housing, and a seal assembly according to the first aspect of the disclosure, wherein: the housing comprises one of the first component of the seal assembly and the second component of the seal assembly, and the compressor wheel comprises the other of the first component of the seal assembly and the second component of the seal assembly. The seal assembly may be used to improve the performance of an impeller assembly, such as for example a compressor or a turbine.

The impeller wheel may define a back face positioned opposite a portion of the housing to define a leakage passage therebetween, and wherein: the back face comprises one of the first component of the seal assembly and the second component of the seal assembly; and the portion of the housing comprises the other of the first component of the seal assembly and the second component of the seal assembly. In some circumstances, fluid may leak through a region of space defined between the back face of the impeller and the housing. This fluid leakage may be driven because the pressure in the region of space is lower than the pressure in the remainder of the housing (i.e. it is typically lower than the pressure within a compressor or turbine volute). However, because the back face of the impeller wheel comprises the first and second component and the housing comprises the other of the first and second component turbulence will be created in the region of space which will impede the flow of fluid through the region of space. Thus, leakage will be reduced and the performance of the impeller assembly will be increased.

The housing may be a bearing housing. The impeller wheel may comprise a plurality of curved impeller blades. The housing may comprise a curved profile that conforms to the curve of the impeller blades. The curved profile of the housing may comprise the first component of the seal assembly. In some circumstances, fluid may leak between the tips of the impeller blades and the corresponding portion of the housing. Because the housing comprises the first component, turbulence is generated in the fluid between the curved profile of the housing and the tips, which acts to impede leakage and thus improve the performance of the impeller assembly.

The impeller wheel may comprise a plurality of impeller blades defining tips. The tips may comprise the first component of the seal assembly. For example, the tips of the impeller blades may comprise recesses or dimples which generate turbulence between the tips of the impeller blades and the housing so as to impede fluid leakage.

The radially outer ends of the impeller blade tips may comprise winglets. The winglets increase the surface area over which leaked fluid must flow and therefore act to further impede leakage. The winglets may be manufactured, for example, by casting as part of the impeller blade and, optionally, subsequently machined.

The impeller assembly may be a compressor assembly. For example, the impeller wheel may be a compressor wheel, and the housing may be a compressor housing. The compressor assembly may be part of a turbocharger. The impeller assembly may be a turbine assembly. For example, the impeller wheel may be a turbine wheel, and the housing may be a turbine housing. The turbine assembly may be part of a turbocharger.

According to a sixth aspect of the disclosure there is provide a shaft assembly comprising: a housing defining a bore having a first diameter; a shaft received within the bore, the shaft defining a second diameter narrower than the first diameter so as to define a clearance between the housing and the bore; and a seal assembly according to the first aspect of the disclosure, wherein: the housing comprises one of the first component of the seal assembly and the second component of the seal assembly, and the shaft comprises the other of the first component of the seal assembly and the second component of the seal assembly. The clearance may comprise the passage of the seal assembly.

The concavity of the first component may comprise a circumferentially extending groove. The housing may be a bearing housing and the shaft may be a turbocharger shaft. The housing may be a turbine housing or a bush. The shaft may be a wastegate shaft.

According to a seventh aspect of the disclosure there is provide a variable geometry turbine comprising: a housing at least partially defining an annular inlet passage; a turbine wheel positioned within the housing and supported for rotation relative to the turbine housing; a nozzle ring comprising a plurality of nozzle vanes; a shroud comprising a plurality of apertures configured to receive the nozzle vanes, wherein the nozzle ring and the shroud are configured for relative movement therebetween; and a seal assembly according to the first aspect of the disclosure, wherein: the nozzle ring comprises one of the first component of the seal assembly and the second component of the seal assembly, and the housing comprises the other of the first component of the seal assembly and the second component of the seal assembly. It will be appreciated that the housing may be a turbine housing and/or a bearing housing. The nozzle ring may be movable relative to the housing, and/or the shroud may be movable relative to the housing.

According to an eighth aspect of the disclosure there is provided a variable geometry turbine comprising: a housing at least partially defining an annular inlet passage; a turbine wheel positioned within the housing and supported for rotation relative to the turbine housing; a nozzle ring comprising a plurality of nozzle vanes; a shroud comprising a plurality of apertures configured to receive the nozzle vanes, wherein the nozzle ring and the shroud are configured for relative movement therebetween; and a seal assembly according to the first aspect of the disclosure, wherein: the nozzle ring comprises one of the first component of the seal assembly and the second component of the seal assembly, and the shroud comprises the other of the first component of the seal assembly and the second component of the seal assembly. For example, where the nozzle vanes comprise the first component, the nozzle vanes may comprise one or more concavities positioned at the leading edge, and/or the trailing edge.

According to a ninth aspect of the disclosure there is provide a variable geometry turbine comprising: a housing at least partially defining an annular inlet passage; a turbine wheel positioned within the housing and supported for rotation relative to the turbine housing; a nozzle ring comprising a plurality of nozzle vanes; a shroud comprising a plurality of apertures configured to receive the nozzle vanes, wherein the nozzle ring and the shroud are configured for relative movement therebetween; and a seal assembly according to the first aspect of the disclosure, wherein: the housing comprises one of the first component of the seal assembly and the second component of the seal assembly, and the shroud comprises the other of the first component of the seal assembly and the second component of the seal assembly. It will be appreciated that the housing may be a turbine housing and/or a bearing housing. The nozzle ring may be movable relative to the housing, and/or the shroud may be movable relative to the housing.

According to a tenth aspect of the disclosure there is provide a method of forming a seal assembly comprising: providing a first component having a concavity, providing a second component, spacing the first component and the second components so apart so as to define a passage therebetween, and orienting the first component so that the concavity at least partially defines the passage. The method may further comprise supporting the first and second components so as to be relatively movable. It will be appreciated that the method of forming a seal assembly of the tenth aspect of the disclosure may be applied to any of the first to ninth aspect of the disclosure.

According to an eleventh aspect of the disclosure there is provided a valve comprising:
 a housing defining a valve chamber defining a longitudinal axis, an inlet adjoining the valve chamber, a primary outlet adjoining the valve chamber, and; a valve member disposed within the valve chamber and supported for rotation about a longitudinal axis of the valve chamber, the valve member and the housing defining a clearance therebetween; and wherein one of the housing and the valve member comprises a concavity at least partially defining the clearance, and wherein no part of the other of the housing and the valve member extends into the portion of the passage bounded by the concavity.

Any of the optional features set out above in relation to the first aspect of the disclosure may be applied equally to the second to eleventh aspects of the disclosure. The features of one aspect of the disclosure may be combined with the features of any of the other aspects of the disclosure, as would be understood by the skilled person.

BRIEF DESCRIPTION OF THE DRAWINGS

Embodiments of the disclosure will now be described, by way of example only, with reference to the accompanying schematic drawings, in which.

Figure 1:
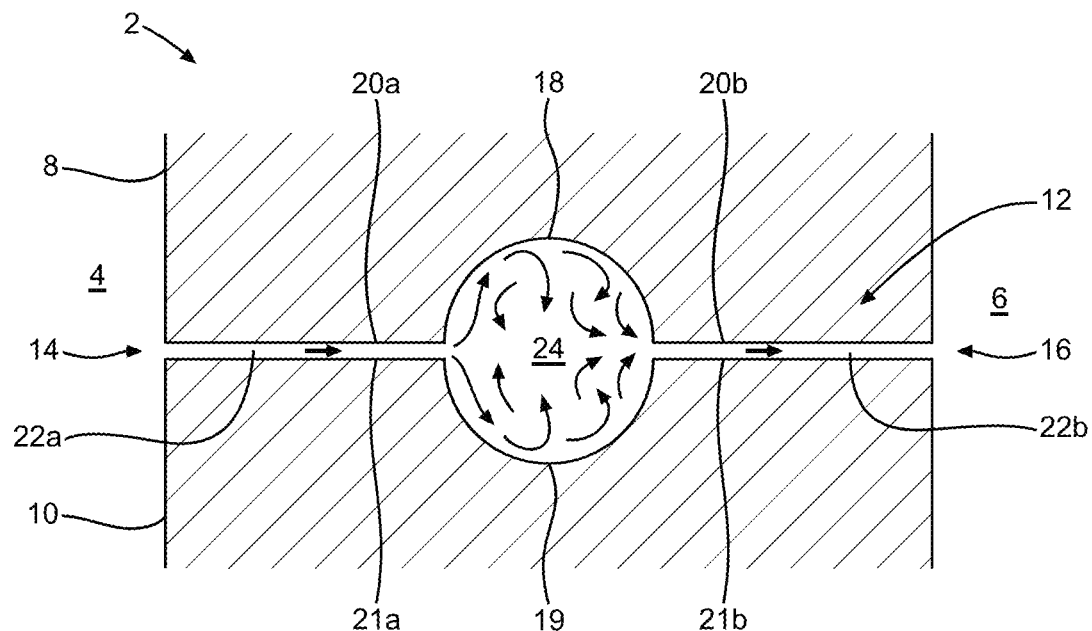
FIG. 1 is a schematic cross-sectional view of a first embodiment of a seal assembly according to the present disclosure in an aligned configuration.

Throughout the following description, like reference numerals have been used to refer to equivalent or corresponding features of the different embodiments of the disclosure. Where a reference numeral has a suffix, this indicates that the feature in question is one of a plurality of equivalent or corresponding features which are present in the same embodiment of the disclosure.

DETAILED DESCRIPTION OF EMBODIMENTS OF THE DISCLOSURE

FIG. 1 shows a cross-sectional schematic view of a seal assembly 2 which separates a first environment 4 from a second environment 6. The first and second environments 4, 6 both contain fluid, such as for example a liquid or a gas. The pressure of the fluid in the first environment 4 is greater than the pressure of the fluid in the second environment 6. The first environment 4 may therefore be referred to as a high pressure environment and the second environment 6 may be referred to as a low pressure environment. The seal assembly 2 defines a lateral direction oriented horizontally in the plane of FIG. 1, a longitudinal direction normal to the plane of FIG. 1, and a vertical direction oriented vertically in the plane of FIG. 1.

The seal assembly 2 comprises a first component 8 and a second component 10. The first and second components 8, 10 are moveable relative to one another in the longitudinal and lateral direction. However, in other embodiments the first component 8 and the second component 10 may be fixed relative to one another. The first component 8 may be, for example, a fixed wall member, and the second component 10 may be, for example, a movable actuating member. For clarity, only part of the first component 8 and the second component 10 are shown in the Figures. The first and second components 8, 10 may have substantially any shape suitable for their particular application. However for the sake of simplicity the first and second components 8, 10 can be assumed to be generally prismatic along the longitudinal direction of the seal assembly 2. However, in alternative embodiments the first and second components 8, 10 may have generally revolved configurations. For example, the one of the first and second components 8, 10 may be generally cylindrical and the other of the first and second components 8, 10 may comprise a bore.

The first component 8 and the second component 10 are spaced apart from one another so as to define a passage 12 therebetween. The passage 12 defines an inlet 14 on the side of the high pressure environment 4 and an outlet 16 on the side of the low pressure environment 6. The passage 12 fluidly connects the high pressure environment 4 to the low pressure environment 8 via the inlet 14 and the outlet 16. The first component 8 comprises a recess 18 and the second component 10 comprises a recess 19. The recess 18 is a concavity formed by the first component 8, and the recess 19 is a concavity formed by the second component 10. No part of the first component 8 (or any intermediate component positioned between the first and second components 8, 10) extends into region of space bounded by the recess 19 of the second component 10, and no part of the second component 10 or any (or any intermediate component positioned between the first and second components 8, 10) extends into the region of space bounded by the recess 18 of the first component 8. The recesses 18, 19 of the first and second components 8, 10 may be manufactured in any suitable way, such as for example by casting, machining, chemical etching, additive manufacturing or the like.

The recesses 18, 19 of the first and second components 8, 10 extend in the longitudinal direction of the first and second components 8, 10. The recesses 18, 19 are in fluid flow communication with the passage 12 such that the recesses 18 define part of the boundary of the passage 12. The recesses 18, 19 are generally semi-circular in cross-section but may define any suitable cross-section, as discussed below. The first component 8 further comprises an upstream dwell portion 20a and a downstream dwell portion 20b. The dwell portions 20a, 20b are positioned either side of the recesses 18 of the first component 8, such that the upstream dwell portion 20a is on the side of the high pressure environment 4 and the downstream dwell portion 20b is on the side of the low pressure environment 6. The second component 10 also comprises an upstream dwell portion 21a and a downstream dwell portion 20b positioned either side of the recess 19 of the second component 10.

FIG. 1 shows an aligned configuration of the seal assembly 2. In the aligned configuration, the first component 8 and the second component 10 are positioned such that the upstream dwell portions 20a, 21a, the recesses 18, 19 and the downstream dwell portions 20b, 21b are aligned opposite one another. The recesses 18, 19 of the first embodiment are generally semi-circular in cross-section. The upstream dwell portions 20a, 21a define an upstream throat section 22a of the passage 12, and the downstream dwell portions 20b, 21b define a downstream throat section 22b. The throat sections 22a, 22b define the portions of the passage 12 having the narrowest clearance between the first component 8 and the second component 10. The recess 18 of the first component 8 and the recess 19 of the second component 10 define a chamber 24 which defines the widest part of the passage 12. During use, high pressure fluid from the first environment 4 enters the passage 12 via the inlet 14. The upstream throat section 22a guides the fluid to the chamber 24, whereupon the fluid expands to fill the chamber 24. After passing through the chamber 24, the fluid subsequently enters the downstream throat section 22b and exits the passage 12 via the outlet 16.

As shown in FIG. 1, the width of the passage 12 in the vertical direction at the cavity 24 is large in comparison to the width of the passage 12 in the vertical direction along the upstream and downstream throat sections 22a, 22b. From the perspective of the fluid, as the fluid enters the cavity 24, the available flow area increases by a large amount over a relatively short distance. As such, the Reynolds number of the fluid in the cavity 24 will be higher than that of the fluid flowing through the throat sections 22a, 22b. Due to the increase in Reynolds number, the fluid within the cavity 24 will become turbulent, such that vortices will form in the chamber 24. Furthermore, it can be seen from FIG. 1 that at the point at which the upstream throat section 22a joins the chamber 24, the walls of the recesses 18, 19 extend away from the direction of flow of the incoming fluid by approximately 90°. The sharp edges of the recesses 18, 19 relative to the upstream dwell portions 20a, 21a and downstream dwell portions 20b, 21b cause the flow to "trip" and begin to recirculate as it expands into the chamber 24, thus aiding the formation of vortices. That is to say, due to the sharp edge of the recesses 18, 19 the boundary layer of the fluid passing through the throat sections 22a, 22b detaches as the fluid enters the recesses 24a, 24b, resulting in turbulence.

The vortices are localised areas of low pressure around which portions of the fluid circulate. The circulating portions of the fluid lose energy to frictional interaction with other portions of the fluid. Because the vortices are low pressure, the vortices also act to draw in fluid, causing the fluid to meander as it crosses the chamber 24. Because the fluid meanders, the path taken by each portion of the fluid increases in length, and therefore increases the amount of energy that is lost to friction. Thus, the presence of the vortices in the chamber 24 impedes the flow of fluid through the seal assembly 2, reducing the overall flow rate through the seal assembly 2. Turbulence dissipates kinetic energy within the flow, the dissipated energy being lost as heat energy due to friction and resulting in a lower flow rate. The vortices in the chamber 24 are transient, such that the vortices generate and dissipate over time. The number, size and transience of the vortices generated will depend on a wide range of factors, including inter alia the type, pressure, density, compressibility, and temperature of the fluid flowing through the chamber 24 and the geometry of the chamber 24 itself.

In general, the more sharply the width of the passage 12 increases, the more effective the passage will be at generating vortices. As such, it is preferable for the recesses 18, 19 to join the throat sections 22a, 22b at around 90°, however shallower angles may also be effective at generating vortices, as discussed below.

In order to create turbulence effectively, the recesses 18 must be sized so that they are large compared to the width of the upstream and downstream throat sections 22a, 22b. The spacing between the dwell portions 20a, 20b of the first component 8 and the dwell portions 21a, 21b of the second component in the vertical direction defines the minimum clearance between the first and second components 8, 10. The recesses 18, 19 define a maximum depth, the maximum depth being the distance between the between the deepest point of the recesses 18, 19 and the adjacent dwell portions 20a-b, 21a-b. In order to generate sufficient turbulence within the recesses 18, 19, the ratio of the maximum depth of the recesses 18, 19 to the minimum clearance between the first and second components 8, 10 is preferably in the range of around 2.5:1 to around 3.75:1, and is preferably at least around 3:1 (however turbulence may still occur outside of this range). In some embodiments, the ratio may be at least around 4:1. It will be appreciated that, in general, the larger the ratio of the maximum depth of the recesses 18, 19 to the minimum clearance between the first and second components 8, 10 the more effective the seal assembly 2 will be at generating turbulence. However, it has been found that in some circumstances it is practical if the ratio of the maximum depth of the recesses 18, 19 to the minimum clearance between the first and second components 8, 10 is no larger than around 15:1. In some embodiments, the ratio may be less than around 8:1 or 5:1. For example, the recesses 18, 19 may define a diameter of around 0.5 mm, 1.0 mm, or 1.5 mm. It has been found that when the diameter of the recess is less than around 0.5 mm the seal is less effective. Generally speaking, sealing is more effective when the recesses 18, 19 are larger, however the maximum size of the recesses 18, 19 may be dictated by packaging constraints. The minimum clearance between the first and second components 8, 10 may be around 0.1 mm, 0.2 mm, 0.3 mm or 0.4 mm.

Because the minimum clearance between the first and second components 8, 10 is relatively small in relation to the maximum depth of the recesses 18, 19, the flow is accelerated as it passes through the throat sections 22a, 22b. The size of the minimum clearance can be chosen so as to ensure that the fluid passing through the first throat section 22a reaches a minimum velocity before entering the cavity 24. Once the flow enters the cavity 24 it is decelerated, resulting in turbulence. Furthermore, because the minimum clearance between the first and second components 8, 10 is generally small in relation to the size of the cavity 24, the upstream throat section 22a and the downstream throat section 22b also provide resistance to flow due to friction. The narrower the distance between the first and second components 8, 10 at the upstream and downstream throat sections 22a, 22b, the higher the frictional resistance imparted by the throat sections 22a, 22b on the flow. As such, it is beneficial to choose the minimum clearance distance between the first and second components 8, 10 so that it is as small as possible. The frictional resistance provided by the throat sections 22a, 22b will contribute to the overall resistance to flow provided by the seal assembly 2.

The first component may define a seal length in the direction of fluid flow direction (i.e. from left to right in FIG. 1). In particular, the seal length is the distance from the inlet 14 of the passage 12 to the outlet 16 of the passage 12. Preferably the ratio of the seal length in the aligned configuration to the maximum depth of the recesses 18, 19 is at least 20:1.

Figure 2:
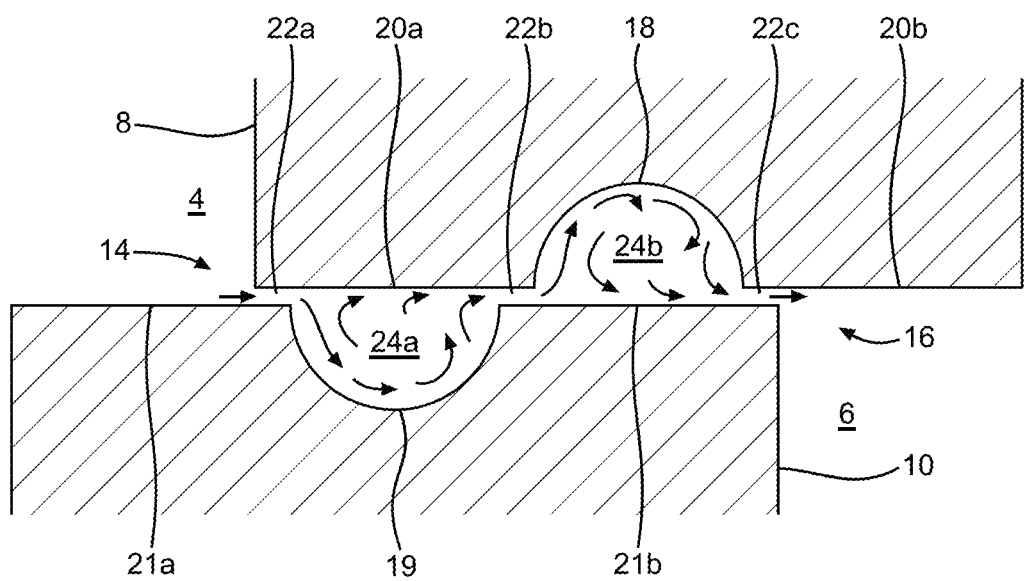
FIG. 2 is a schematic cross-sectional view of the first embodiment in an unaligned configuration.

FIG. 2 shows the seal assembly 2 of the first embodiment of the disclosure in an unaligned configuration. In particular, first component 8 is positioned relative to the second component 10 such that the upstream dwell portion 20a of the first component 8 is opposite the recess 19 of the second component 10, and the recess 18 of the first component 8 is opposite the downstream dwell portion 21b of the second component 10. During use, fluid enters the inlet 14 and passes into a first throat section 22a of the passage 12 defined between the upstream dwell portion 20a of the first component 8 and the upstream dwell portion 21a of the second component 10. The fluid then passes into a first chamber 24a defined between the upstream dwell portion 20a of the first component 8 and the recess 19 of the second component 10. When the fluid enters the first chamber 24a, the cross-sectional area available for fluid flow increases sharply over a short distance, and thus the fluid in the first chamber 24a becomes turbulent and results in the formation of vortices. As set out above in relation to the aligned configuration, the vortices in the first chamber 24a form a barrier impeding the flow of fluid out of the first chamber 24a.

The fluid in the first chamber 24a then passes into a second throat section 22b defined between the upstream dwell portion 20a of the first component 8 and the downstream dwell portion 21b of the second component 10. After the second throat section, the fluid passes to a second chamber 24b defined between the recess 18 of the first component 8 and the downstream dwell portion 21b of the second component 10. As with the first chamber 24a, when the fluid enters the second chamber 24b the cross-sectional area available for fluid flow increases sharply over a short distance, and hence the fluid in the second chamber 24b becomes turbulent. As for the first chamber 24a, the turbulent fluid in the second chamber 24b will also comprise vortices which impede the flow of fluid into and out of the second chamber 24b. The fluid in the second chamber 24b then passes into a third throat section 22c defined between the downstream dwell portion 20b of the first component 8 and the downstream dwell portion 21b of the second component 10. Once the fluid has passed through the third throat section 22c, it leaves the seal assembly via the exit 16.

As shown in FIG. 2, the geometry of the recesses 18, 19 at the point at which the fluid enters the first and second chambers 24a, 24b diverges from the overall direction of fluid flow by approximately 90°. As such, from the perspective of the fluid, the available area for fluid flow increases sharply over a relatively short distance, even though one side of the first and second chambers 24a, 24b is defined by a dwell portion 20a, 21b and therefore remains "flat". Therefore, even though the recesses 18, 19 of the first and second components 8, 10 are not aligned, the expansion in flow area provided by the geometry of the recesses 18, 19 still produces sufficient turbulence to impede the flow of fluid through the seal assembly 2. Furthermore, the sharp edges of the recesses 18, 19 as the flow enters the first and second chambers 24a, 24b also causes the flow to "trip" resulting in additional turbulence impeding flow through the seal assembly 2. In order to provide sufficient sealing ability when the recesses 18, 19 are unaligned, it is beneficial to choose the dimensions of the recesses 18, 19 and the minimum clearance between the first and second components 8, 10 based upon the desired sealing performance in the unaligned configuration.

Figure 3:
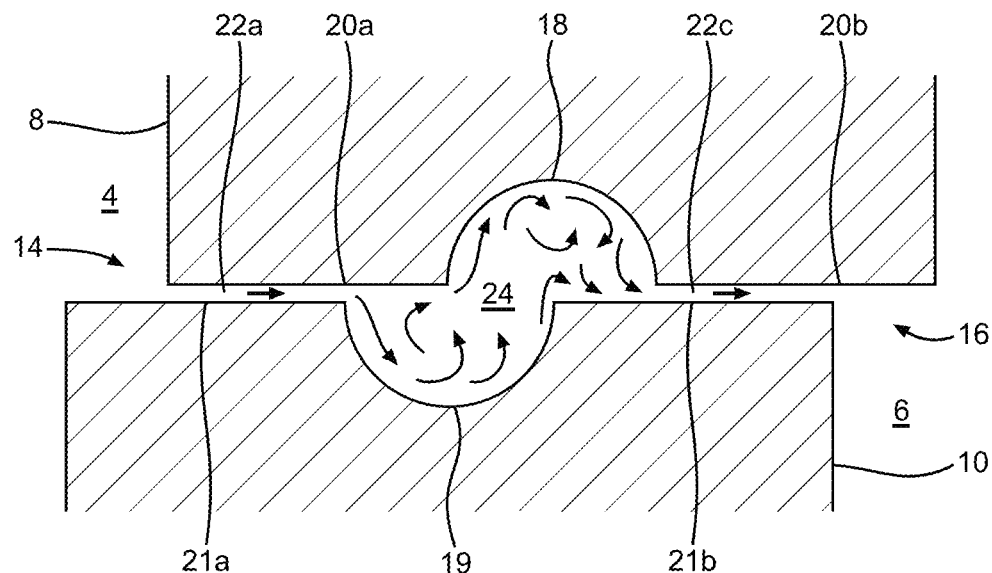
FIG. 3 is a schematic cross-sectional view of the first embodiment in an overlapped configuration.

FIG. 3 shows the seal assembly 2 of the first embodiment of the disclosure in an overlapped configuration. The overlapped configuration is any configuration of the first and second components 8, 10 in which the recesses 18, 19 are laterally overlapped but are not fully aligned. In the configuration of FIG. 3, the first component 8 is positioned relative to the second component 10 such that part of the recess 18 of the first component 8 is opposite part of the second dwell portion 21b of the second component 10 and part of the recess 19 of the second component 10. Likewise, part of the recess 19 of the second component 10 is opposite part of the first dwell portion 20a of the first component 8 and part of the recess 18 of the first component 8. The recesses 18, 19 therefore define a generally S-shaped configuration.

During use, in the overlapped configuration fluid enters the seal assembly 2 via the inlet 14 and passes into a first throat section 22a defined between the upstream dwell portions 20a, 21a of the first and second components 8, 10. The fluid then passes into a chamber 24 defined between the recesses 18, 19, the upstream dwell portion 20a of the first component 8 and the downstream dwell portion 21b of the second component. As the fluid enters the chamber 24 from the first throat section 22a, the available flow area defined between the recess 19 of the second component 10 and the first dwell portion 20a of the first component 8 increases sharply, causing vortex generation in the flow. In addition, the sharp edge between the first dwell portion 21a and the recess 19 of the second component 10 also causes the flow to "trip", resulting in further turbulence. Furthermore, the sharp edge between the first dwell portion 20 and the recess 18 of the first component 8 and the sharp edge between the second dwell portion 21b and the recess 19 of the second component 10 also act to "trip" the flow, causing further turbulence and vortex generation. The flow through the chamber 24 in the overlapped configuration is therefore sufficiently turbulent to impede flow through the seal assembly 2.

It can be seen that in all of the aligned, unaligned and overlapped configurations, the seal assembly 2 is able to provide resistance to fluid flow. However, because the resistance to flow is caused by the vortices, and the vortices are formed by the fluid itself, no additional sealing members are required in order to impede flow through the seal assembly. Furthermore, as discussed above, the vortices are generated by sharp increases in the available flow area between the first and second components 8, 10. As such, the seal arrangement 2 does not need to define a tortuous path in order to impede the flow. Consequently, the first and second components 8, 10 do not require features which overlap in the vertical direction of FIGS. 1 to 3 in order to provide a seal. Put another way, no part of the first component 8 extends into the recess 19 of the second component 10, and no part of the second component 10 extends into the recess 18 of the first component 8. Furthermore, no intermediate components, such as for example a sealing element, extends into the recess 18, 19 of the first or second components 8, 10. As such, the recesses 18, 19 are substantially free of solid objects, and only fluid passes into and out of the recesses 18, 19.

Because the first and second components 8, 10 are substantially free of solid objects, the first component 8 and the second component 10 are free to move relative to one another in both the lateral and longitudinal directions whilst the minimum clearance between the first component 8 and the second component 10 (i.e. the vertical distance between the dwell portions 20a, 20b of the first component and the dwell portions 21a, 21b of the second component 10) remains the same. The seal arrangement 2 therefore provides increased freedom of movement between the first and second components 8, 10 as compared, for example, to a labyrinth type seal.

The fluid passing through the seal assembly defines a direction of fluid flow from the inlet 14 to the outlet 16. With reference to FIGS. 1 to 3, the direction of fluid flow is generally parallel to the lateral direction. As described above, because no part of the first component 8 extends into the recess 19 of the second component 10, and because no part of the second component 10 extends into the recess 18 of the first component 10 this means that the first and second components 8, 10 are free to move relative to one another generally towards and against the direction of fluid flow. As such, the seal assembly 2 is particularly suited to applications in which movement of the first and second components in the direction of fluid flow is required.

The surfaces of the recesses 18, 19 may be rough or smooth. It has been found that sealing performance is improved when the recesses 18, 19 have a surface roughness (Ra) within the range of around 10 μm to around 50 μm, and preferably around 25 μm. where the roughness is lower than this range not enough turbulence is created to dissipate energy to create the seal. Where the roughness is higher than this range flow begins to stagnate and prevents the formation of vortexes. It has been found that surface roughness (Ra) of 25 μm provides the optimum sealing effect. Surface roughness for these purposes is measured in terms of the arithmetical mean deviation, Ra, however substantially any suitable measure of surface roughness may be used (e.g. root mean squared, Rq, or the like). The dwell portions 20a, 20b, 21a, 21b may have any suitable surface roughness, however preferably the dwell portions 20a, 20b, 21a, 21b are smooth so as to avoid any possible grinding or wearing effects in the event that the first component 8 engages the second component 10 as the two are moved relative to one another.

Figure 4:
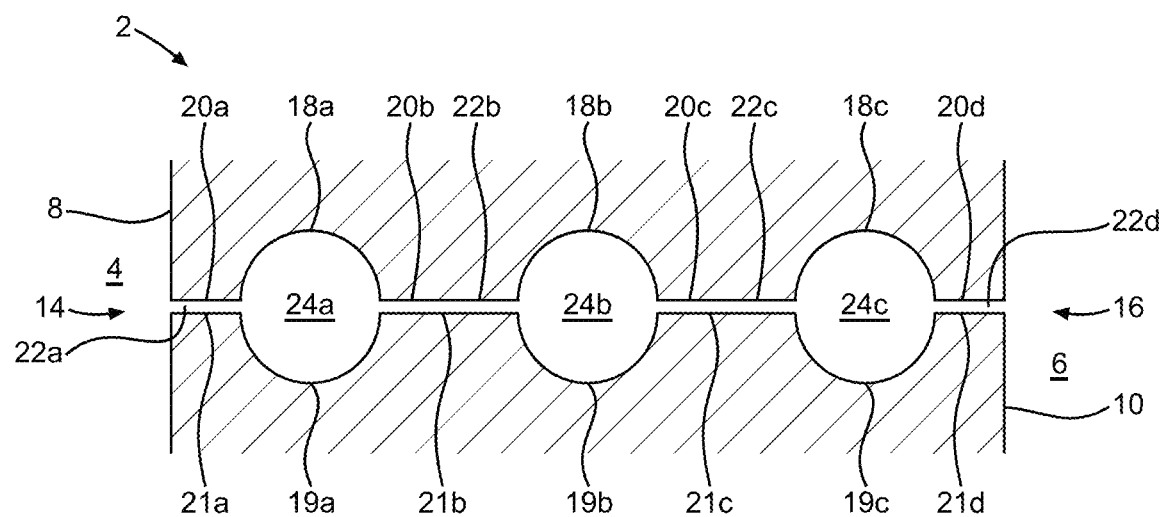
FIG. 4 is a schematic cross-sectional view of a second embodiment of a seal assembly according to the present disclosure comprising multiple recesses.

In alternative embodiments, the first and second components 8, 10 of the seal assembly 2 may comprise a plurality of recesses 18, 19. One such embodiment is shown in FIG. 4, which depicts a schematic cross-section of a second embodiment of a seal assembly 2 according to the present disclosure. The second embodiment of the disclosure differs from the first embodiment in that the first component 8 comprises a plurality of recesses 18a-c, and the second component 10 comprises a plurality of recesses 19a-c. The seal assembly 2 of the second embodiment is shown in the aligned configuration, such that a first recess 18a of the first component 8 is positioned opposite a first recess 19a of the second component 10, a second recess 18b of the first component 8 is positioned opposite a second recess 19b of the second component 10, and a third recess 18c of the first component 8 is positioned opposite a third recess 19c of the second component 10. The plurality of recesses 18a-c of the first component 8 and the plurality of recesses 19a-c of the second component 10 define a plurality of cavities 24a-c therebetween. The recesses 18a-c of the first component 8 are separated by a plurality of dwell portions 20a-d, and the recesses 19a-c of the second component 10 are separated by a plurality of dwell portions 21a-d. The dwell portions 20a-d of the first component 8 and the dwell portions 21a-d of the second components 10 define a plurality throat sections 22a-d therebetween, in a corresponding manner to that set out above in relation to the first embodiment.

During use, fluid enters the seal assembly 2 from the high pressure environment 4 via the inlet 14 and passes into a first throat section 22a. The fluid then subsequently passes out of the first throat section 22a, and through a first cavity 24a, a second throat section 22b, a second cavity 24b, a third throat section 24c, a third cavity 24c and a fourth throat section 24d. Finally, the fluid passes out of the seal assembly 2 via the outlet 16 and into the low pressure environment 6. It will be appreciated that the first and second components 8, 10 may be moved relative to one another so that they define unaligned and overlapped configurations in the same manner as for the first embodiment.

As discussed above in relation to the first embodiment, the throat sections 22a-d will provide resistance to fluid flow due to the narrow clearance between the first and second components 8, 10 in combination with the frictional force exerted on the fluid by the dwell portions 20a-d, 21a-d. Furthermore, each cavity 24a-c will allow the fluid to expand, thus causing vortex formation in the same way as for the first embodiment. However, because the seal assembly of the second embodiment comprises a plurality of throat sections 22a-d and cavities 24a-c arranged in series, the overall resistance to flow through the seal assembly 2 of the second embodiment is higher than that of the first embodiment. Put another way, each of the throat sections 22a-d and cavities 24a-d will cause the fluid to lose an associated amount of energy. The total amount of energy lost by the fluid as is passes from the inlet 14 to the outlet 16 is the sum of the associated amounts of energy for each of the throat sections 22a-d and cavities 24a-d. Therefore, by increasing the number of throat sections 22a-d and cavities 24a-d through which the fluid must pass, the total amount of energy loss through the seal assembly 2 can be increased. Because more energy is lost by the fluid as it passes through the seal assembly 2, the resistance to flow through the seal assembly 2 is increased and therefore the sealing effectiveness of the seal assembly 2 is improved. However, it will be appreciated that for most operating conditions the cavities 24a-c will cause the fluid to lose more energy than the throat sections 22a-d, and therefore the total resistance can be increased by increasing the number of cavities 24a-d.

The first and second components 8, 10 may comprise substantially any number of recesses 18, 19. However, it has been found that sealing performance is improved where the first component 8 and/or the second component 10 comprises a minimum of four or five recesses 18, 19. Generally, sealing performance will be improved as the number of recesses 18, 19 increases. However, a minimum number of four or five recesses 18, 19 provides an effective seal whilst saving the cost of manufacturing further recesses 18, 19. For a given seal length, it is generally preferable to increase the number of recesses 18, 19 than to increase the size (e.g. diameter) of the individual recesses 18, 19 as this will produce a more effective seal. However, the total number of recesses 18, 19 may be dependent upon packaging constraints.

The recesses 18a-c, 19a-c may be spaced apart from one another in the lateral direction by any suitable distance. In particular, the recesses may be arranged so that the centre of each recess is spaced from the centre of the adjacent recess by a distance equal to the width of the recess, 1.5 times the width of the recess, twice the width of the recess, 2.5 times the width of the recess or more. However, it has been found that the optimum lateral spacing between the centres of each recess is approximately at least twice the width of the recess.

In particular, in the embodiment of FIG. 4 each of the recesses 18a-c of the first component 8 the recesses 19a-c of the second component 10 defines a width in the lateral direction, and the width of each recess 18a-c, 19a-c is approximately the same. Furthermore, the second and third dwell portions 20b, 20c of the first component 8 and the second and third dwell portions 21b, 21c of the second component 10 each define a width in the lateral direction that is approximately equal to the width of the recesses 18a-c, 19a-c. As such, the centre of the first recess 18a of the first component 8 is spaced apart from the centre of the second recess 18b of the first component 8 by approximately twice the width of the recesses 18a-c. The same applies for the spacing between the second the third recesses 18b, 18c of the first component 8 and the spacing between the recesses 19a-c of the second component 10. When the lateral spacing between the recesses is at least twice the width of each recess, this ensures that in all positions of the first component 8 relative to the second component 10 a throat section will exist. The presence of the throat section acts as a restrictor causing greater resistance to flow. However, it will be appreciated that when the lateral spacing between the recesses is increased beyond twice the width of the recesses, fewer recesses can fit on the first and second components 8, 10. As such, it is desirable to maintain the lateral spacing of the recesses 18a-c, 19a-c to as close to twice their width as possible.

Figure 5:
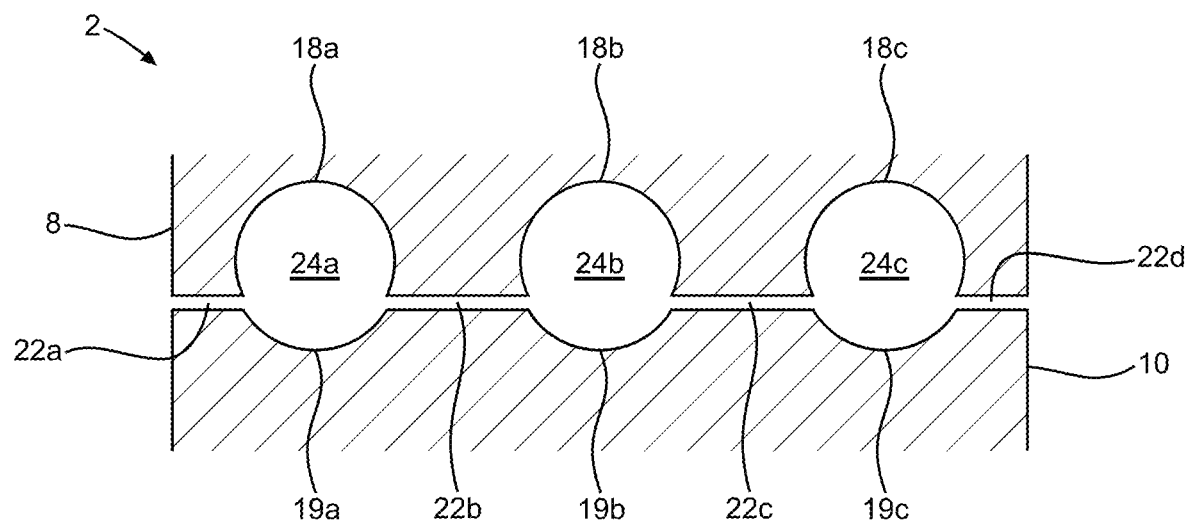
FIG. 5 is a schematic cross-sectional view of a third embodiment of a seal assembly according to the present disclosure comprising recesses of unequal sizes.

In some embodiments, the recesses 18 of the first component 8 maybe a different size and shape to the recesses 19 of the second component 10. FIG. 5 shows a schematic cross-sectional view of a third embodiment of a seal assembly 2 according to the present disclosure. The third embodiment of the disclosure differs from the second embodiment of the disclosure in that the recesses 18a-c of the first component 8 are larger than the recesses 19a-c of the second component 10. In the embodiment shown in FIG. 5, when the first and second components 8, 10 are in an aligned configuration, the recesses 18a-c of the first component 8 and the recesses 19a-c of the second component 10 together define generally circular cavities 24a-c. However, the recesses 18a-c of the first component 8 define major segments of the circular cavities 24a-c and the recesses 19a-c of the second component define minor segments of the circular cavities 24a-c. As such, the throat sections 22a-d are not aligned with the centres of the circular cavities 24a-c. The throat sections 22a-d may be displaced away from the centres of the circular passages by any suitable distance, for example by a distance equal to around half of the radius of the circular cavities 24a-c.

Because the recesses 18a-c of the first component 8 are a different size and shape to the recesses 19a-c of the second component, the throat sections 22a-d are vertically offset from the centres of the cavities 24a. This may be advantageous for example in situations where it is not possible to create large cavities on the surface of the second component 10, for example where the thickness of the second component 10 in the vertical direction is relatively thin.

Figure 6:
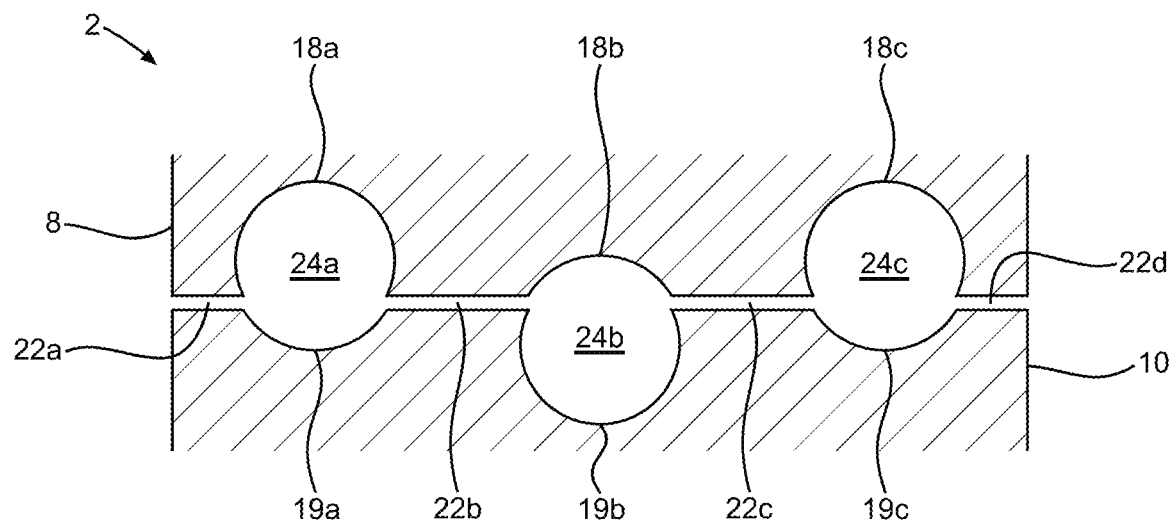
FIG. 6 is a schematic cross-sectional view of a fourth embodiment of a seal assembly according to the present disclosure comprising an alternating pattern of recesses.

FIG. 6 shows a fourth embodiment of a seal assembly 2 according to the present disclosure. The fourth embodiment of the seal assembly 2 differs from the third embodiment in that the second recess 18b of the first component 8 is smaller than the second recess 19b of the second component 10. As such, the relationship regarding which of the recesses of the first and second component 8, 10 is larger than the other is reversed for the second recess 18b, 19b. In other embodiments, this relationship may be reversed for any of the plurality of recesses 18, 19.

Figure 7:
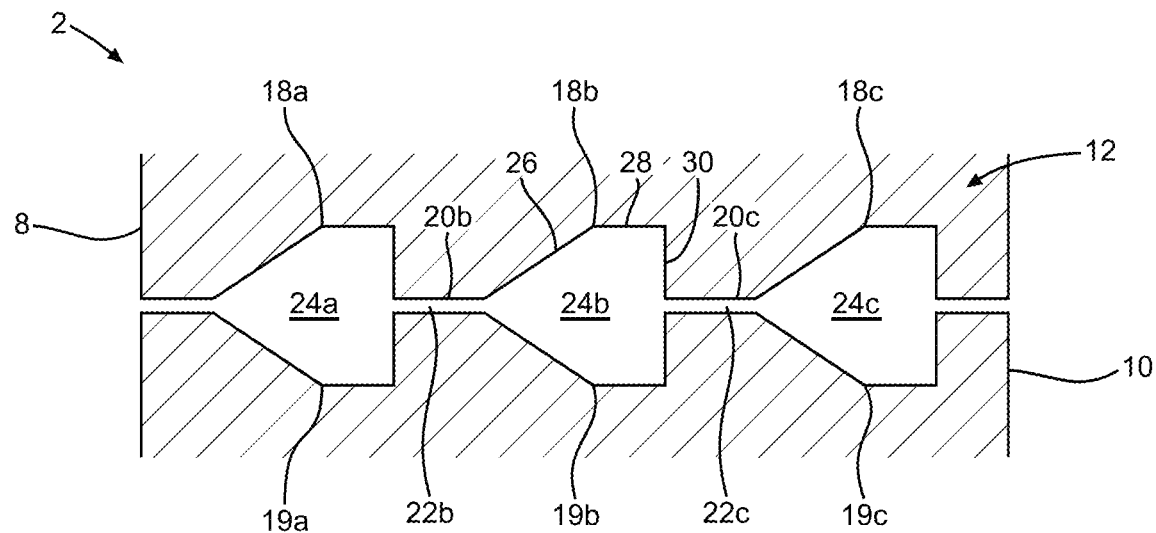
FIG. 7 is a schematic cross-sectional view of a fifth embodiment of a seal assembly according to the present disclosure comprising sawtooth recesses.

FIG. 7 shows a fifth embodiment of a seal assembly 2 according to the present disclosure. The fifth embodiment of the seal assembly 2 differs from the first to fourth embodiments of the seal assembly 2 in that the recesses 18, 19 of the first and second components 8, 10 define a generally sawtooth-like profile. That is to say, the recesses 18, 19 are asymmetric from upstream to downstream. With reference to the second recess 18b of the first component 8, the sawtooth-like profiles comprise a sloped portion 26, a flat portion 28, and a vertical portion 30. The sloped portion 26 extends between an upstream dwell portion, such as the second dwell portion 20b of the first component 8, and the flat portion 28. The sloped portion 26 is angled away from the lateral direction such that the width of the passage 12 increases in the direction from the upstream dwell portion 20b to the flat portion 28. The angle of the sloped portion 26 relative to the lateral direction is preferably within the range of around 20° to around 70°, and more preferably is in the range of around 30° to around 60°. The flat portion 28 extends between the sloped portion 26 and the vertical portion 30. The flat portion 28 is generally parallel to the lateral direction, however in alternative embodiments the flat portion 28 may be sloped towards or away from the lateral direction by a small amount, for example plus or minus an angle in the range of around 0° to around 5°. The vertical portion 30 extends between the flat portion 28 and a downstream dwell portion, such as the third dwell portion 20c of the first component 8. The vertical portion 30 extends generally in the vertical direction. That is to say, the vertical portion 30 extends generally normal to the lateral direction within the plane of FIG. 7. However, in alternative embodiments the vertical portion 30 may be angled relative to the vertical direction by a small amount, for example plus or minus an angle in the range of around 0° to around 5°.

With reference to the second cavity 24b, during use, the fluid enters the second cavity 24b from the second throat section 22b. The sloped portions 26 of the recesses 18b, 19b cause the passage 12 to widen, thus increasing the Reynolds number of the fluid in the second cavity 24b, resulting in turbulent flow and the formation of vortices. Because the vertical portion 30 is inclined generally normal to the lateral direction, some of the fluid in the second cavity 24b will impinge upon the vertical portion 30. The vertical portion 30 prevents further movement of the fluid in the lateral direction, and causes the impinged fluid to recirculate, thus creating further vortices and leading to additional frictional losses. It will be appreciated that in alternative embodiments, one or more (or all) of the sloped portions 26 and the vertical portions 30 may be swapped around so that the sawtooth profile is reversed. In such embodiments the fluid will enter the cavities 24a-c on the side of the vertical portions 30, such that rapid expansion of the fluid will occur in the cavities 24a-c creating turbulence.

Figure 8:
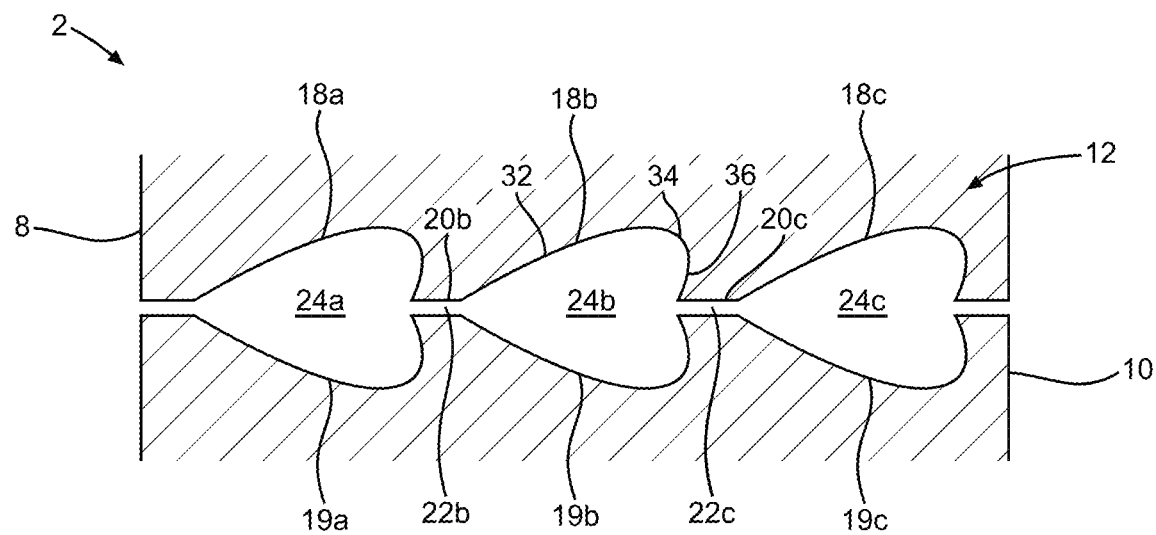
FIG. 8 is a schematic cross-sectional view of a sixth embodiment of a seal assembly according to the present disclosure comprising scooped recesses.

FIG. 8 shows a sixth embodiment of a seal assembly 2 according to the present disclosure. The sixth embodiment of the seal assembly 2 differs from the fifth embodiment of the seal assembly 2 in that the recesses 18, 19 define generally scooped profiles. Such scooped profiles are another example of an asymmetric recess. With reference to the second recess 18b of the first component 8, the scooped profiles comprise a diverging portion 32, an apex 34, and a backflow portion 36. The diverging portion 32 extends between an upstream dwell portion, such as the second dwell portion 20b of the first component 8, and the apex 34. The diverging portion 32 is angled away from the lateral direction such that the width of the passage 12 increases in the direction from the upstream dwell portion 20b to the apex 34. The angle of the diverging portion 32 relative to the lateral direction at the join between the upstream dwell portion 20b and the diverging portion 32 is preferably within the range of around 20° to around 70°, and more preferably is in the range of around 30° to around 60°. The apex 34 extends between the diverging portion 32 and the backflow portion 36. The backflow portion 36 extends between the apex 34 and a downstream dwell portion, such as the third dwell portion 20c of the first component 8. At the join between the backflow portion 36 and the downstream dwell portion 20c of the first component 8, the backflow portion 36 is preferably angled relative to the vertical direction by an angle in the range of around 0° to around 30°, around 5° to around 20°, or around 10° to around 15°.

With reference to the second cavity 24b, during use, the fluid enters the second cavity 24b from the second throat section 22b. The diverging portion 32 of the recesses 18b, 19b cause the passage 12 to widen, thus increasing the Reynolds number of the fluid in the second cavity 24b, resulting in turbulent flow and the formation of vortices. Furthermore the apex 34 and the backflow portion 36 act to scoop the fluid in the chamber around so that a portion of the fluid begins to flow back towards the second (i.e. upstream) throat section 22b. The "scooped" fluid acts to form a barrier which impedes flow through the cavity 24b. Furthermore, the "scooped" fluid will mix with the fluid entering the second cavity 24b from the upstream throat portion 22b, thus resulting in further turbulence and vortex formation. It will be appreciated that in alternative embodiments, one or more (or all) of the diverging portions 32 and the backflow portions 36 may be swapped around so that the scooped profile is reversed. In such embodiments the fluid will enter the cavities 24a-c on the side of the backflow portions 36, such that rapid expansion of the fluid will occur in the cavities 24a-c creating turbulence.

Figure 9:
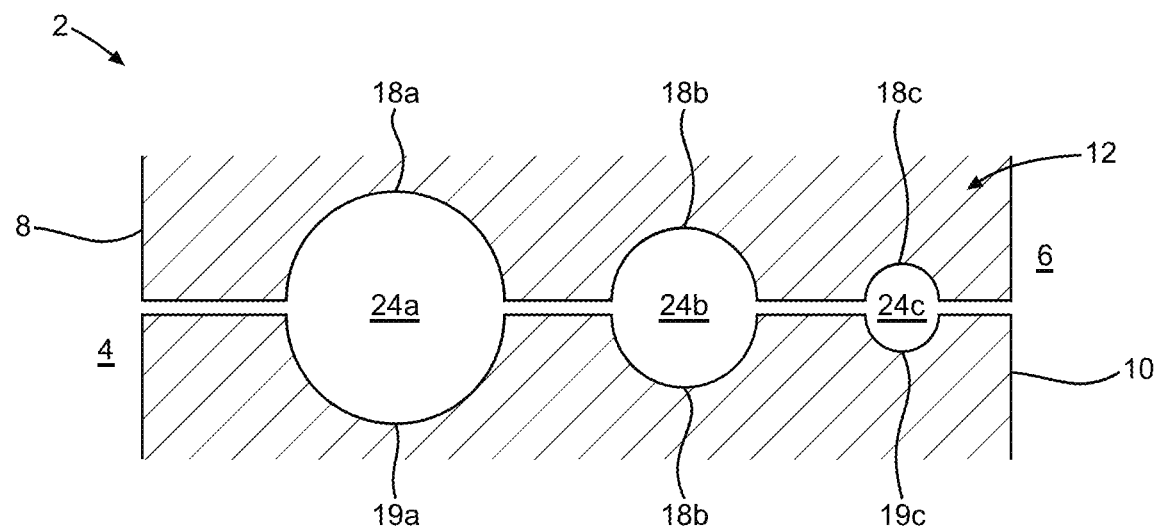
FIG. 9 is a schematic cross-sectional view of a seventh embodiment of a seal assembly according to the present disclosure comprising recesses of decreasing size.

FIG. 9 shows a seventh embodiment of a seal assembly 2 according to the present disclosure. The seventh embodiment of the seal assembly 2 differs from the second to sixth embodiments of the seal assembly 2 in that the recesses 18a-c, 19a-c of the first and second components 8, 10 are varied in size. In particular, the first recesses 18a, 19a are larger than the second recesses 18b, 19b, which are in turn larger than the third recesses 18c, 19c. As such, the first cavity 24a is larger than the second cavity 24b which is larger than the third cavity 24c. This is advantageous where the pressure differential between the high pressure environment 4 and the low pressure environment 6 driving the flow through the passage 12 is highly variable. In particular, when the pressure differential is large, the velocity of the fluid flowing through the passage 12 will be relatively high, and when the pressure differential is small the velocity of the fluid flowing through the passage 12 will be relatively low. The size of the first cavity 24a may be chosen so that the Reynolds number of the fluid flowing through the first cavity 24a is large enough to result in turbulent flow even when the velocity of the fluid is relatively high. Likewise, the size of the third cavity 24c may be chosen so that it is able to generate turbulence when the velocity of the fluid is relatively low. As such, the seal assembly 2 of the seventh embodiment is able to ensure that turbulence is generated across a range of different flow conditions. Furthermore, the difference in size between adjacent recesses 18a-c, 19a-c can be chosen so that a constant pressure drop occurs over each recess 18a-c, 19a-c.

Figure 10:
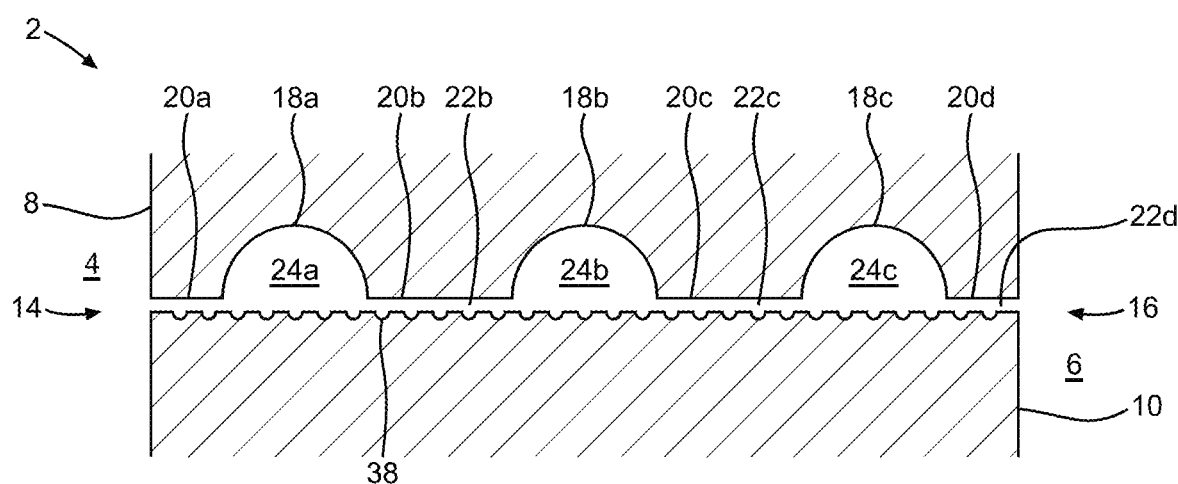
FIG. 10 is a schematic cross-sectional view of an eighth embodiment of a seal assembly according to the present disclosure comprising dimples.

FIG. 10 shows an eighth embodiment of a seal assembly 2 according to the present disclosure. In eighth embodiment of the seal assembly 2, the second component 10 comprises a plurality of dimples 38. The dimples 38 differ from the recesses of the previous embodiments in that the dimples 38 are discrete concave indentations formed on the surface of the second component 10, and as such the dimples 38 are examples of concavities. The dimples 38 are generally circular such that, for a given dimple 38, the width of the dimple 38 in the lateral direction is approximately the same as the width of the dimple 38 in the longitudinal direction. Collectively, the dimples 38 have the effect that they create a roughened surface on the second component 10. The roughened surface generates turbulence in the fluid flowing through the passage 12. The turbulent flow generated by the dimples 38 contains vortices and therefore increases the resistance to fluid flow through the seal assembly 2. The dimples 38 may be formed by machining or pressing the surface of the second component 10.

Figure 11:
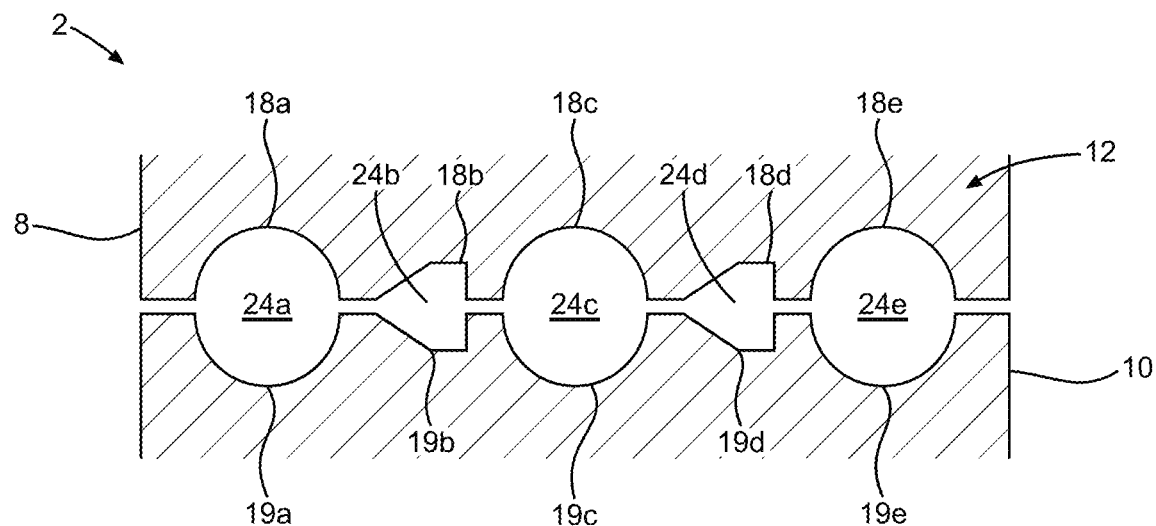
FIG. 11 is a schematic cross-sectional view of a ninth embodiment of a seal assembly according to the present disclosure comprising a mixture of different recess geometries.

FIG. 11 shows a ninth embodiment of a seal assembly 2 according to the present disclosure. In the seal assembly 2 of the ninth embodiment, the first component comprises three semi-circular recesses 18a, 18c, 18d interspaced with sawtooth-like recesses 18b, 18d. Likewise, the second component 10 comprises three semi-circular recesses 19a, 19c, 19d interspaced with sawtooth-like recesses 19b, 19d. As such, the recesses of the first and second components 8, 10 form an alternating pattern of semi-circular and sawtooth-like profiles. Furthermore, the semi-circular recesses define a depth in the vertical direction which is greater than a corresponding depth defined by the sawtooth-like recesses. It will be appreciated that a given recess size and geometry will be suited to creating vortices for a particular range of flow conditions. Because the seal assembly 2 of the ninth embodiment comprises two different kinds of recess that are of different shapes and sizes to one another, the seal assembly 2 will cause vortex formation across a larger range of flow conditions.

Figure 12:
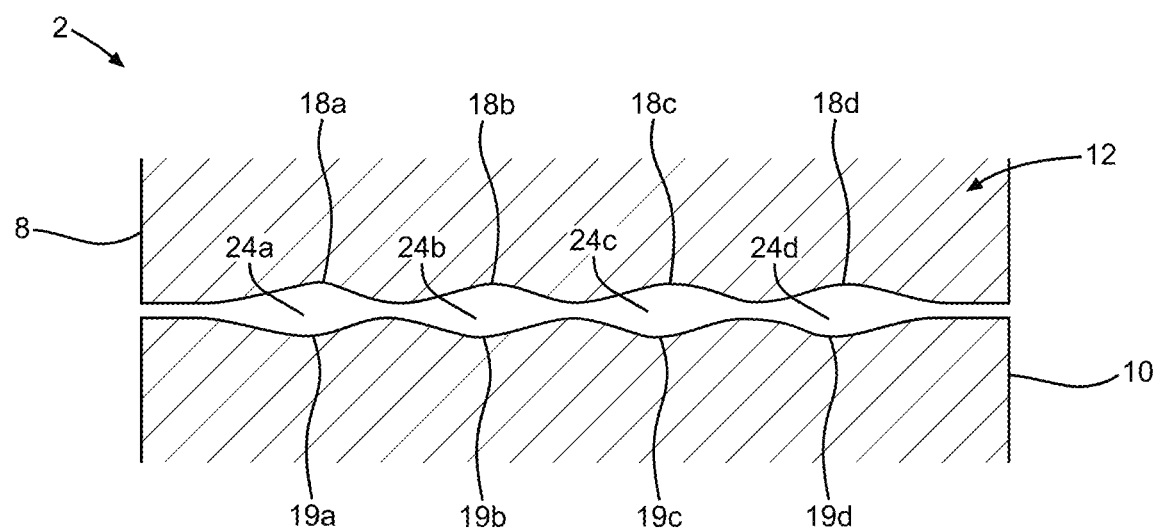
FIG. 12 is a schematic cross-sectional view of a tenth embodiment of a seal assembly according to the present disclosure comprising smooth recesses.

FIG. 12 shows a tenth embodiment of a seal assembly 2 according to the present disclosure. In the seal assembly 2 of the tenth embodiment, the first component 8 comprises four recesses 18a-d and the second component 10 comprises four recesses 19a-d. The recesses 18a-d of the first component 8 and the recesses 19a-d of the second component smoothly transition between peak points (at which the distance between the first and second components 8, 10 is minimal) and trough points (at which the distance between the first and second components 8, 10 is largest). The recesses 18a-d, 19a-d act to diffuse and then constrict flow through the passage 12. This causes turbulence which impedes flow through the seal assembly 2.

Although a number of embodiments of a seal assembly 2 according to the present disclosure have been discussed above, it will be appreciated that further embodiments of the seal assembly 2 are contemplated as forming part of the disclosure. For example, in alternative embodiments the recesses 18, 19 may comprise cross-sectional profiles aside from those illustrates above, including for example: triangular, square, rectangular or any other suitable cross-sectional profile. Such profiles may be symmetric, such as in the first to fourth embodiments, or may be asymmetric, such as in the fifth and sixth embodiments. The first and second components 8, 10 may comprise substantially any suitable number of recesses 18, 19. Furthermore, it will be appreciated that the size and shape of the recesses 18, 19 may be chosen to be most effective at creating turbulence over a range of flow conditions that correspond to the operating conditions of the seal assembly.

In some embodiments the number of recesses 18 of the first component 8 may be unequal to the number of recesses 19 of the second component 10. In some embodiments one of the first or second components 8, 10 may comprise no recesses, such that that side of the passage 12 defined by that component consists entirely of a single extended dwell portion. Furthermore, in alternative embodiments one or both of the first and second components 8, 10 may comprise recesses which are not separated by dwell portions. In further embodiments the seal assembly 2 may comprise more than one type of recess size or geometry, for example three or more types. The different recess types may be arranged in substantially any suitable pattern. The recesses 18, 19 may extend in the longitudinal direction of the first and/or second components 8, 10 for only a portion of or for the entire longitudinal extend of the first and/or second component 8, 10. The seal assembly 2 may comprise a mixture of longitudinally extending recesses 18, 19 and dimples 32. The recesses 18, 19 themselves may also comprise dimples 32 form on their surfaces. It will further be appreciated that in the recesses 18, 19 need not define straight paths but could define curved, sinusoidal or zig-zagged paths or any other suitable path geometry.

In yet further embodiments, the recesses 18 or the first component 8 and/or the recesses 19 of the second component 10 may be generally hemispherical or domed. The recesses 18, 19 may be substantially any spherical cap shape, and need not necessarily be a hemisphere. It has been found that where the recesses are shaped as spherical caps (including hemispheres), the sealing effectiveness is approximately the same as embodiments where the recesses 18, 19 are elongate grooves. The spherical caps may be spaced apart by the same distances and proportions as described above in relation to the embodiments in which the recesses 18, 19 are elongate grooves.

The seal assembly 2 of the embodiments described above may be implemented in a range of different applications. One such application is to improve sealing of a rotary bypass valve for a turbine, such as for example within a turbocharger system. However, it will be appreciated that the seal assembly 2 could be implemented in substantially any suitable valve.

Figure 13:
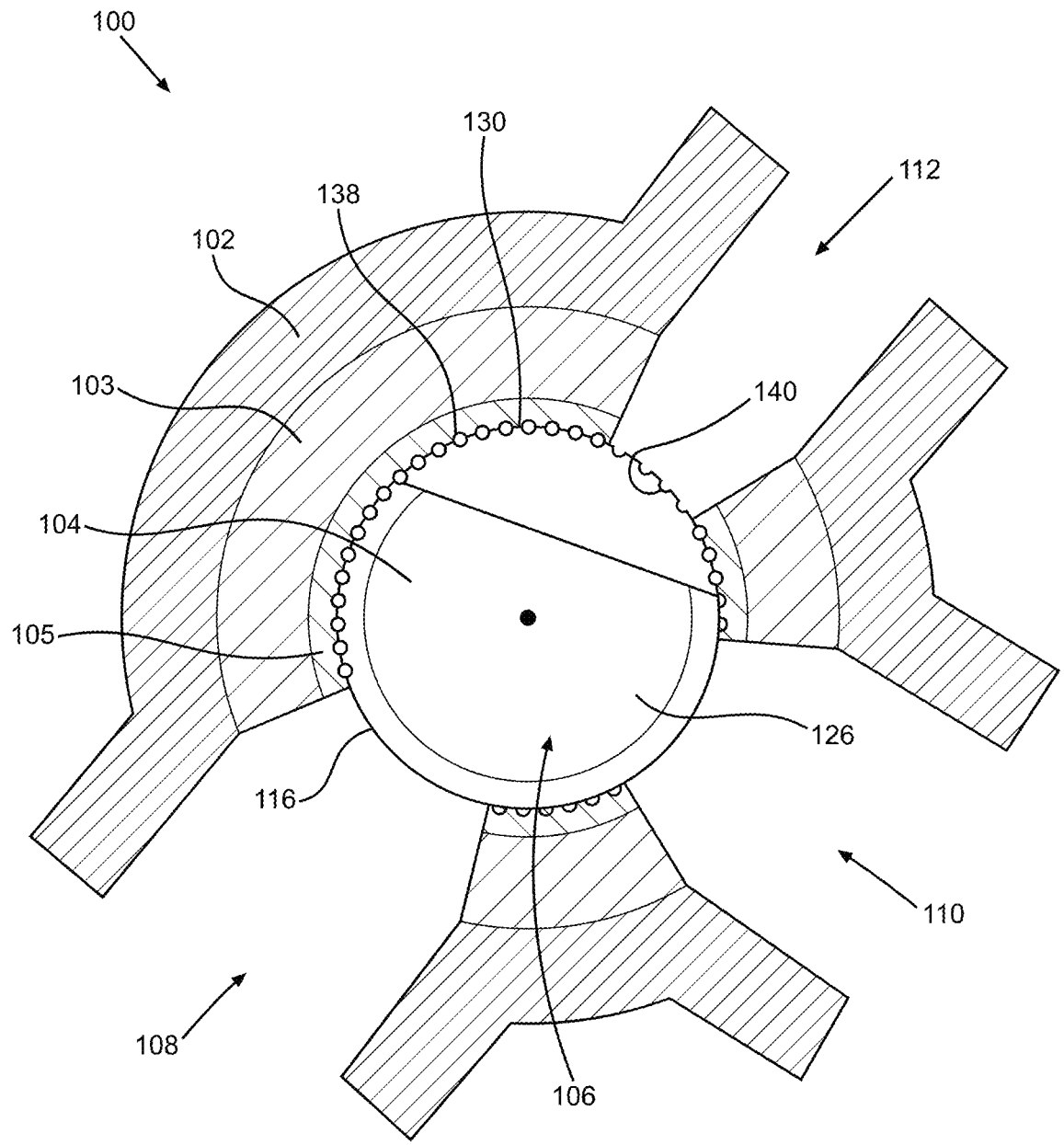
FIG. 13 is a schematic cross-sectional view of a rotary valve.
Figure 14:
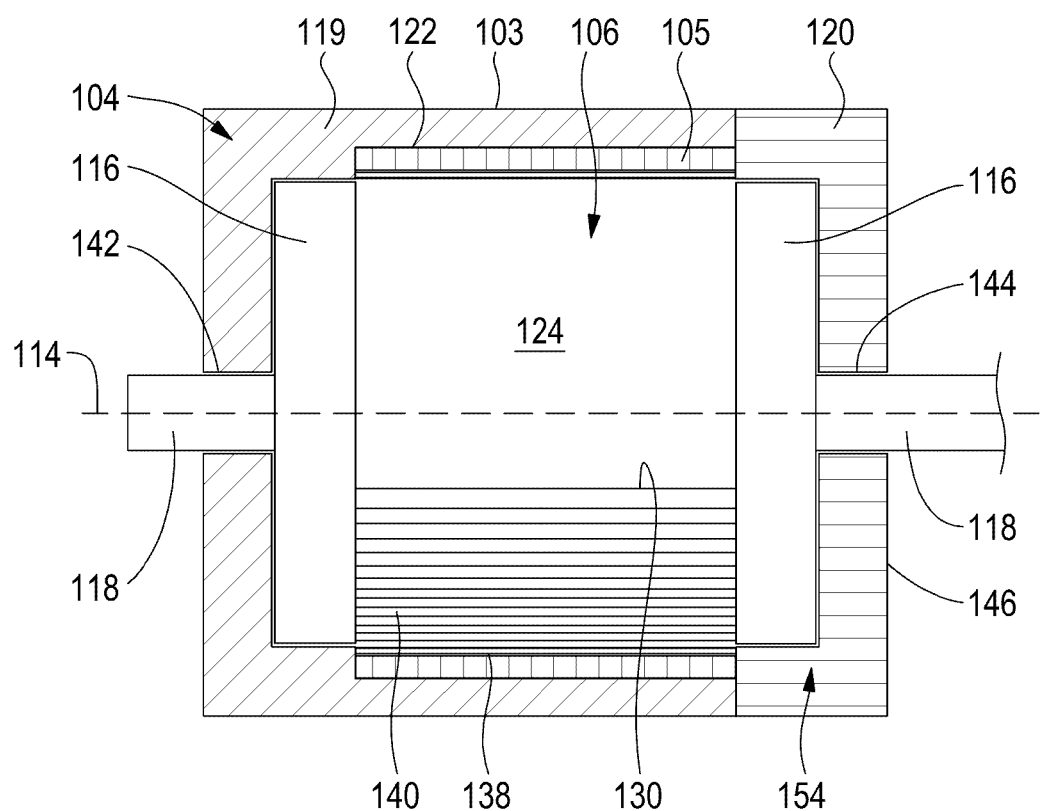
FIG. 14 is a schematic partial cross-sectional side view of the rotary valve of FIG. 13.
Figure 15:
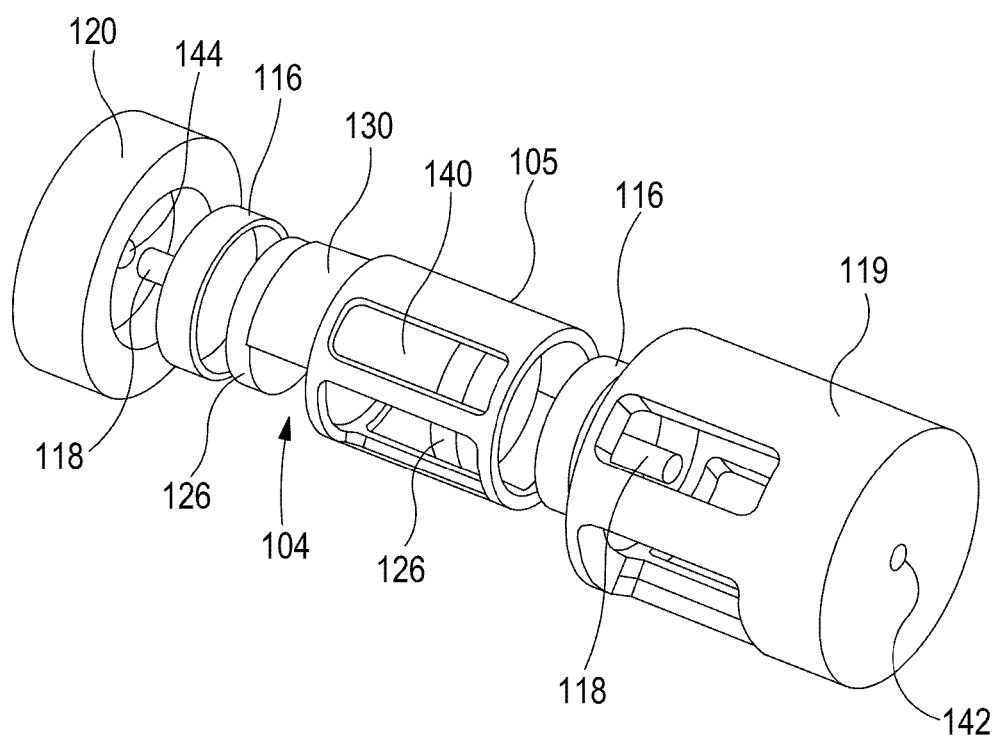
FIG. 15 is a schematic partial exploded view of the rotary valve of FIGS. 13 and 15.

FIGS. 13 to 15 depict a rotary valve 100 for use as a turbine control valve. The rotary valve 100 may be used, for example, within an engine system comprising a turbocharger. The rotary valve 100 comprises an outer housing 102, an inner housing 103, a sleeve 105, and a valve member 104. The outer housing 102, inner housing 103, and the sleeve 105 are generally tubular. The sleeve 105 is received within the inner housing 103 and the inner housing 103 is received within the outer housing 102. The outer housing 102, inner housing 103 and sleeve 105 are rotationally fixed in relation to one another. The sleeve 105 defines a valve chamber 106 within which the valve member 104 is positioned.

The outer housing 102, inner housing 103 and sleeve 105 define an inlet 108, a primary outlet 110 and a secondary outlet 112. The inlet 108, primary outlet 110 and secondary outlet 112 lie within a common plane and extend from an exterior of the rotary valve 100 to the valve chamber 106 via openings formed in the outer housing 102, inner housing 103 and sleeve 105. The valve chamber 106 is generally cylindrical and defines a longitudinal axis 114 of the rotary valve 100 that extends generally transverse to the common plane defined by the inlet 108, primary outlet 110 and secondary outlet 112 (i.e. orthogonal to the perspective of FIG. 13). During use, the inlet 108 is connected to an exhaust of an internal combustion engine (not shown) so that it receives exhaust gas from the internal combustion engine. The primary outlet 110 is connected to an inlet of a turbine (not shown), for example forming part of a turbocharger. The secondary outlet 112 is connected to a bypass passage (not shown) for delivering exhaust gas to a position downstream of the turbine without passing through the turbine. The portions of the outer housing 102 defining the inlet 108, primary outlet 110 and/or secondary outlet 112 may additionally comprise mounting flanges.

As shown most clearly in FIG. 15, the valve member 104 is generally cylindrical and comprises end walls 126 positioned at longitudinally opposite ends of the body 105 which are connected by a longitudinally extending web 130. The diameter of the valve member 104 may be any suitable size, however in the present embodiment the diameter of the valve member 104 is in the range of around 30 mm to around 100 mm. The end walls 126 and the web 130 define a channel 124 that penetrates the body 105 in a direction generally perpendicular to the longitudinal axis 114. The end walls 126 are received within end caps 116 having longitudinally extending shafts 118 aligned with the longitudinal axis 114. The end caps 116 are rotationally fixed with respect to the valve member 104, for example by using an interference fit or an adhesive, such that the valve member 104 rotates with the end caps 116.

As shown in FIGS. 14 and 15, the inner housing 103 comprises a first housing portion 119 and a second housing portion 120. The first housing portion 119, second housing portion 120 and sleeve 105 are shown in cross-section in FIG. 14 for ease of reference. However the valve member 104 and end caps 116 are not shown in cross-section, such that their external surfaces are visible in FIG. 14. The first and second housing portion 119, 120 are generally cup-shaped such that the first and second housing portions 119, 120 at least partially receive the valve member 104. The first housing portion 119 comprises a stepped section 122 for receiving the sleeve 105, and the second housing portion 120 abuts the sleeve 105 to axially retain the sleeve 105 between the first and second housing portions 119, 120. The shafts 118 of the end caps 116 extend through a bore 142 of the first housing portion 119 and a bore 144 of the second housing portion 120. The shafts 118 support the valve member 104 for rotation within the valve chamber 106 about the longitudinal axis 114. At least one of the shafts 118 of the end caps 116 extends out of the rotary valve 100 and is connected to an actuation mechanism (not shown) so as to control the rotational position of the valve member 104 within the valve chamber 106. The bores 142, 144 may further comprise bearings or bushings to support the valve member 104 for rotation. Although not shown in FIG. 14 or 15, the outermost diameters of the end caps 116 may be sealed against the first and second housing portions 119, 120 using a physical contact seal. The end caps 116 function to retain the valve member 104 within the rotary valve 100 and to support the valve member 104 for rotation.

The valve member 104 defines a closed-bypass configuration and an open-bypass configuration. The closed-bypass configuration is shown in FIG. 13 and corresponds to a position of the valve member 104 in which the web 130 blocks the entrance to the secondary outlet 112 (and hence to the bypass passage) whilst permitting fluid to flow from the inlet 108 to the primary outlet 110 (and hence to the turbine). The open-bypass configuration corresponds to a position of the valve member 104 in which the valve member 104 has been rotated so that the web 130 is no longer blocking the entrance to the secondary outlet 112 (so that fluid can flow to the bypass passage) whilst also permitting fluid flow to the primary outlet 110. This corresponds to a position in which the valve member 104 shown in FIG. 13 has been rotated approximately 90° in an anti-clockwise direction.

With reference to FIG. 13, the sleeve 105 comprises a plurality of inwardly-facing recesses 138 and the valve member 104 comprises a corresponding plurality of outwardly-facing recesses 140. The recesses 138, 140 have a diameter of approximately 1.5 mm. Both sets of recesses 138, 140 extend generally parallel to the longitudinal axis 114 of the rotary valve 100. The inwardly-facing recesses 138 of the sleeve 105 are formed on a generally cylindrical inner surface of the sleeve 105, and the outwardly-facing recesses 140 of the valve member 104 are formed on a generally arcuate outer surface of the web 130. The outer surface of the web 130 and the inner surface of the sleeve 105 are spaced apart from one another by a narrow clearance 154. The clearance 154 is a relatively narrow gap which ensures that the valve member 104 is free to rotate within the valve chamber 106 relative to the sleeve 105.

Due to the presence of the clearance 154, during use, some exhaust gas is able to leak past the valve member 104 between the valve member 104 and the sleeve 105. When the valve member 104 is in the closed position, a portion of the exhaust gas may leak from the inlet 108 to the secondary outlet 112. The leaked exhaust gas does not pass through the turbine, and therefore the amount of energy absorbed by the turbine and the efficiency of the turbine is decreased. However, due to the presence of the outwardly-facing recesses 138 of the sleeve 105 and the corresponding inwardly-facing recesses 140 of the valve member 104, the overall rate of leakage into the secondary outlet 112 via the clearance 154 is reduced. In particular, as described above in relation to the seal assembly 2, the recesses 138, 140 cause the formation of vortices which act to substantially impede the flow of exhaust gas through the space between the valve member 104 and the sleeve 105. As such, the sleeve 105 and the valve member 104 may be considered to correspond to the first and second components 8, 10 of the seal assembly 2 described above.

Because the recesses 138, 140 generate vortices that impede leakage of exhaust gas into the secondary outlet 112, the rotary valve 100 does not require a contact seal between the sleeve 105 and the valve member 104. By contrast, if a contact seal were used between the sleeve 105 and the valve member 106, this would exert a relatively large frictional force that would resist rotation of the valve member 104. Furthermore, because the recesses 138, 140 are concave features formed on opposing surfaces of the sleeve 105 and the valve member 104, no part of the sleeve 105 extends into the recesses 140 of the valve member 104 and no part of the valve member 104 extends into the recesses 138 of the sleeve 105. As such, the valve member 104 is free to rotate relative to the housing 102 about the longitudinal axis 114. By contrast, a conventional labyrinth seal would not be appropriate for creating a seal between the valve member 104 and the sleeve 105 because in order to create the labyrinth seal a portion of the valve member 104 (or an intermediate component) would need to extend into a portion of the sleeve 105 (or vice versa), which would prevent rotation of the valve member 104 about the longitudinal axis 114. The rotary valve 100 therefore provides improved sealing without constraining movement of the valve member 104.

The use of a sleeve 105 to define the inwardly-facing recesses is beneficial because the sleeve can by manufactured more cheaply than the outer housing 102 or inner housing 103. The sleeve 105 can be manufactured, for example, by casting, machining or chemical etching. In some embodiments, the sleeve 105 may be made from a corrugated sheet of material to define the inwardly-facing recesses 138. It will be appreciated that because the sleeve 105 surrounds the valve member 104, the sleeve 105 may be considered to form part of a housing of the rotary valve 100. Furthermore, some embodiments may not comprise an inner housing 103. However, the benefit of using an inner housing 103 is that the valve member 104, end caps 116, sleeve 105, and inner housing 103 can be pre-assembled into a cartridge which is then simply inserted into the outer housing 102 thus improving the ease of assembly. Furthermore, because the components of the cartridge are generally smaller than the outer housing 102 it is easier to control the geometry (i.e. tolerances) of the components in the cartridge, and thereby avoid the need to tightly control the geometry of the relatively large outer housing.

However, in alternative embodiments, the outer housing 102 or the inner housing 103 may define the plurality of inwardly facing recesses 138. Such embodiments may therefore not comprise a sleeve 105. In yet further embodiments, the shafts 118 may be integrally formed with the valve member 104 such that the rotary valve 100 does not comprise end caps 116 (or, put another way, the end caps 116 may be integrally formed with the valve member 104). By eliminating the end caps 116 and/or the sleeve 105, fewer components are required to define the rotary valve 100, and therefore the rotary valve 100 is simpler and cheaper to manufacture and assemble.

The housing 102 and/or the sleeve 105 may comprise a single concavity or a plurality of concavities for generating vortices. The concavity (or concavities) may have substantially any geometry for generating vortices, such as for example any of the geometries described above in relation to the seal assembly 2.

In some embodiments, the rotary valve 100 may be for use with a twin-entry turbine. As such, the inlet 108, the primary outlet 110 and secondary outlet 112 may be divided into two axially separated sections (for example, by the presence of a dividing wall in the plane normal to the longitudinal axis 114 of the valve chamber 106). In such embodiments, the valve member 104 may comprise a dividing wall positioned between the end walls 126 so as to split the channel 124 into two axially separated sections. The dividing wall acts to prevent transient pressure fluctuations causing interference between the exhaust gasses passing through the two separated sections of the rotary valve 100.

Figure 24:
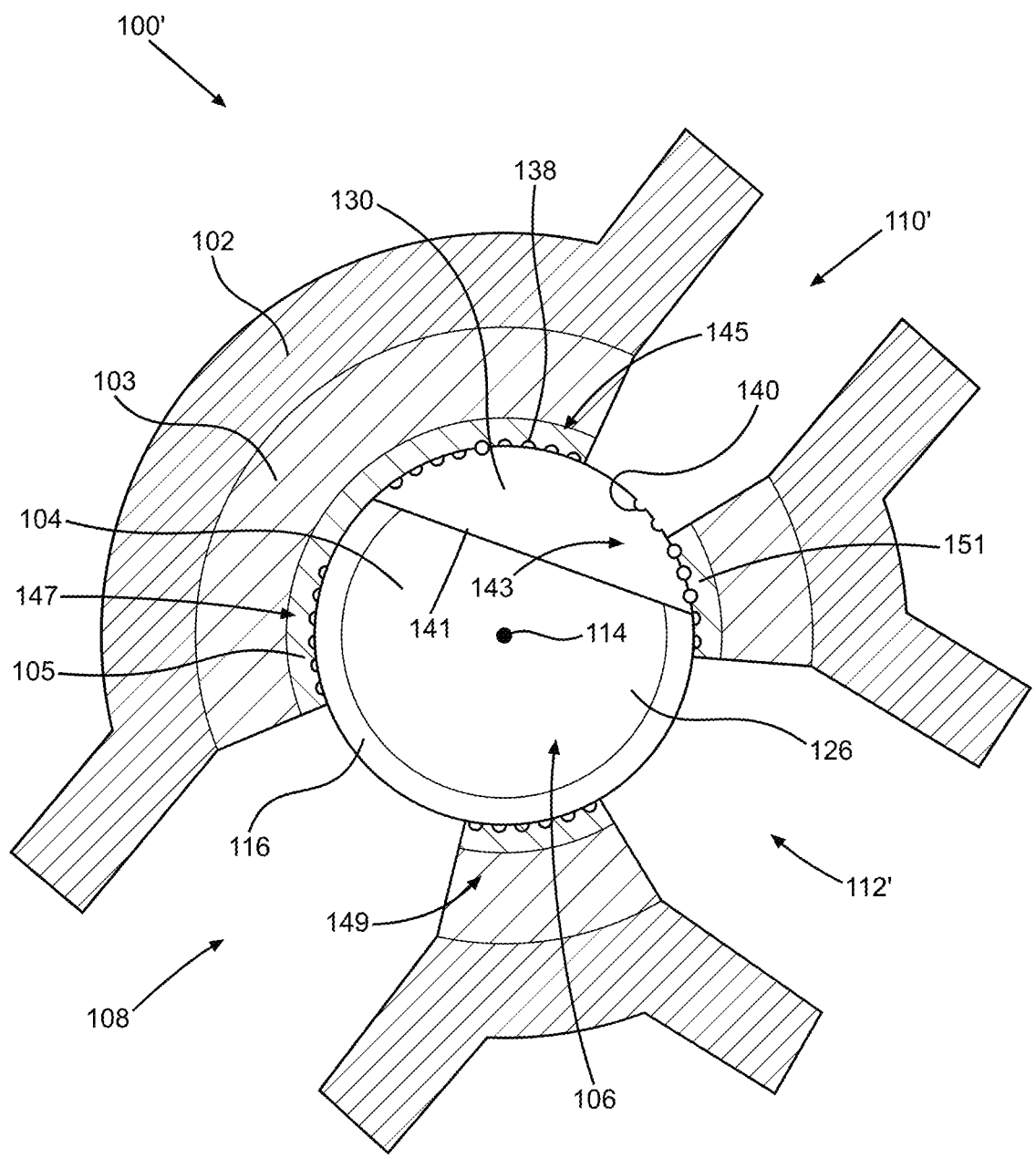
FIG. 24 is a schematic cross-sectional view of an alternative embodiment of a rotary valve.

FIG. 24 shows rotary valve 100' which is an alternative embodiment of the rotary valve 100 described above. In rotary valve 100' the primary outlet 110' is positioned opposite the inlet 108 and the secondary outlet 112' is positioned at approximately 90° to the inlet 108 and the primary outlet 110'.

It has been found that around five consecutively arranged recesses 138, 140 provide the optimum sufficient sealing effect. As such, the recesses 138, 140 may be positioned in groups of five at or near to a point of leakage, whilst saving the cost of machining further recesses into the valve member 104 or the sleeve 105. Such an arrangement is shown in FIG. 24. In particular, it can be seen from FIG. 24 that the web 130 of the valve member 104 comprises five recesses 140 arranged in a first grouping 141 and five further recesses 140 arranged in a second grouping 143. The first grouping 141 is positioned adjacent to a first edge of the web 130 and the second grouping 143 is positioned adjacent to a second edge of the web 130. Furthermore, the sleeve 105 comprises five recesses 138 positioned in a third grouping 145 positioned in a first grouping 145 adjacent to the primary outlet 110' and five recesses 138 positioned in a fourth grouping 147 adjacent to the inlet 108. The third and fourth groupings are positioned on the opposite side of the sleeve 105 to the secondary outlet 112'. The sleeve 105 further comprises five recesses 138 positioned in a fifth grouping 149 between the inlet 108 and the secondary outlet 112', and five recesses 138 positioned in a sixth grouping 151 between the primary outlet 110' and the secondary outlet 112'.

An important sealing position of the valve member 104 is when the valve member 104 is blocking the primary outlet 110'. As such, it is preferable that the valve 100' comprises at least the first and second groupings 141, 143, the third grouping 145 and the sixth grouping 151. That is to say, preferably a grouping of around five recesses is present on the sleeve 105 either side of the outlet connected to the bypass passage to improve the seal effect when the web 130 is blocking the bypass passage. However, it will be appreciated that in alternative embodiments the valve 100' may comprise substantially any suitable number of groupings. The groupings may be placed in any suitable position within the valve member 104. Furthermore, the groupings may comprise any suitable number of recesses (e.g. three, four, six or more recesses). The groupings need not all comprise the same number of recesses, and the number of recesses in each grouping may be varied in dependence upon packaging constraints.

Figure 23:
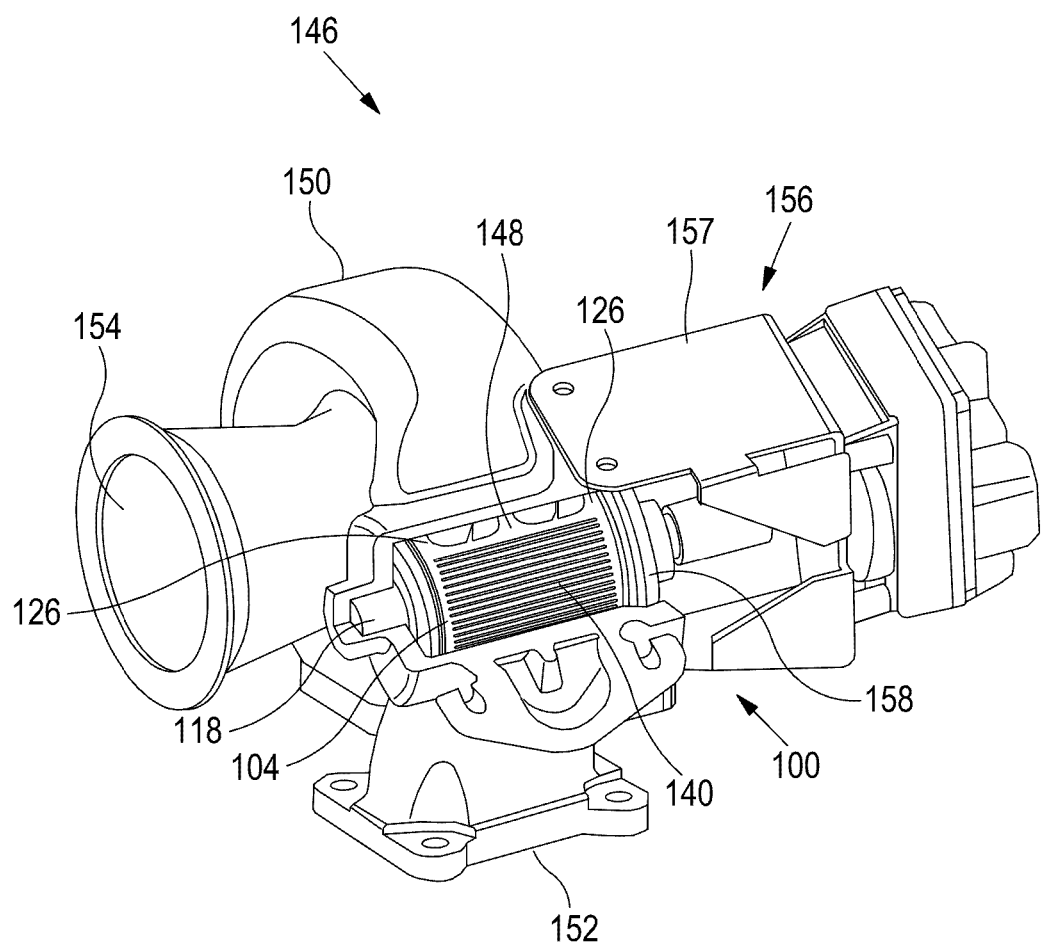
FIG. 23 is a cut-out perspective view of a turbine housing having a rotary valve comprising a seal assembly according to the present disclosure.

FIG. 23 shows a turbine 146 comprising a generally volute-shaped turbine housing 150 having an integrated rotary valve 100. The turbine housing defines an inlet 152 and an outlet 154. The valve member 104 is connected to an actuator 156 that is configured to control the angular position of the valve member 104. The actuator 156 is supported by a bracket 157 mounted to the turbine housing 150. The valve member 104 is visible through a cut-out portion of the turbine housing 150. The valve member 104 of the turbine 146 does not comprise end caps 116, and the shafts 118 are integrally formed with the valve member 104. The turbine 146 is a twin volute (twin entry) turbine, and therefore the valve member 104 comprises a dividing wall 148 positioned approximately halfway between the end walls 126.

The turbine housing 150 is equivalent to the first housing portion 119 of the previous embodiment of the rotary valve 100 described above (that is to say, the turbine housing 150 may define the first housing portion 119). The turbine housing 150 may therefore define one of the first and second components 8, 10 of the seal assembly 2 described above. The turbine 146 comprises a cover plate 158 which is equivalent to the second housing portion 120 of the previous embodiment of the rotary valve 100 described above (that is to say, the cover plate 158 may define the second housing portion 120). The cover plate 158 may therefore define the other of the first and second components 8, 10 of the seal assembly 2. Alternatively, the valve member 104 may define one of the first and/or second components 8, 10 of the seal assembly 2.

Because the rotary valve 100 is integrated with the turbine housing 150, the rotary valve 100 can be positioned closer to the turbine wheel (not shown) than in alternative arrangements where the entire rotary valve is positioned upstream of the turbine housing 150. It will be appreciated that because the turbine housing is generally volute-shaped, the cross-sectional area available for fluid flow decreases around the turbine wheel. Due to the Bernoulli principle, the pressure of the fluid will be higher where the cross-sectional area available for flow is reduced. Because the rotary valve 100 is closer to the turbine wheel, the rotary valve 100 may be positioned at a point where the flow area is reduced, and hence the fluid pressure in the passage is lower. The lower fluid pressure in the passage creates a larger pressure differential across the seal assembly 2 (formed by the turbine housing 150 and the valve member 104) which drives turbulence creation within the recesses 138, 140 thus improving the effectiveness of the seal. Furthermore, integrating the rotary valve 100 with the turbine housing 150 reduces the complexity of the turbine 148, saving costs during manufacture and assembly.

Figure 16:
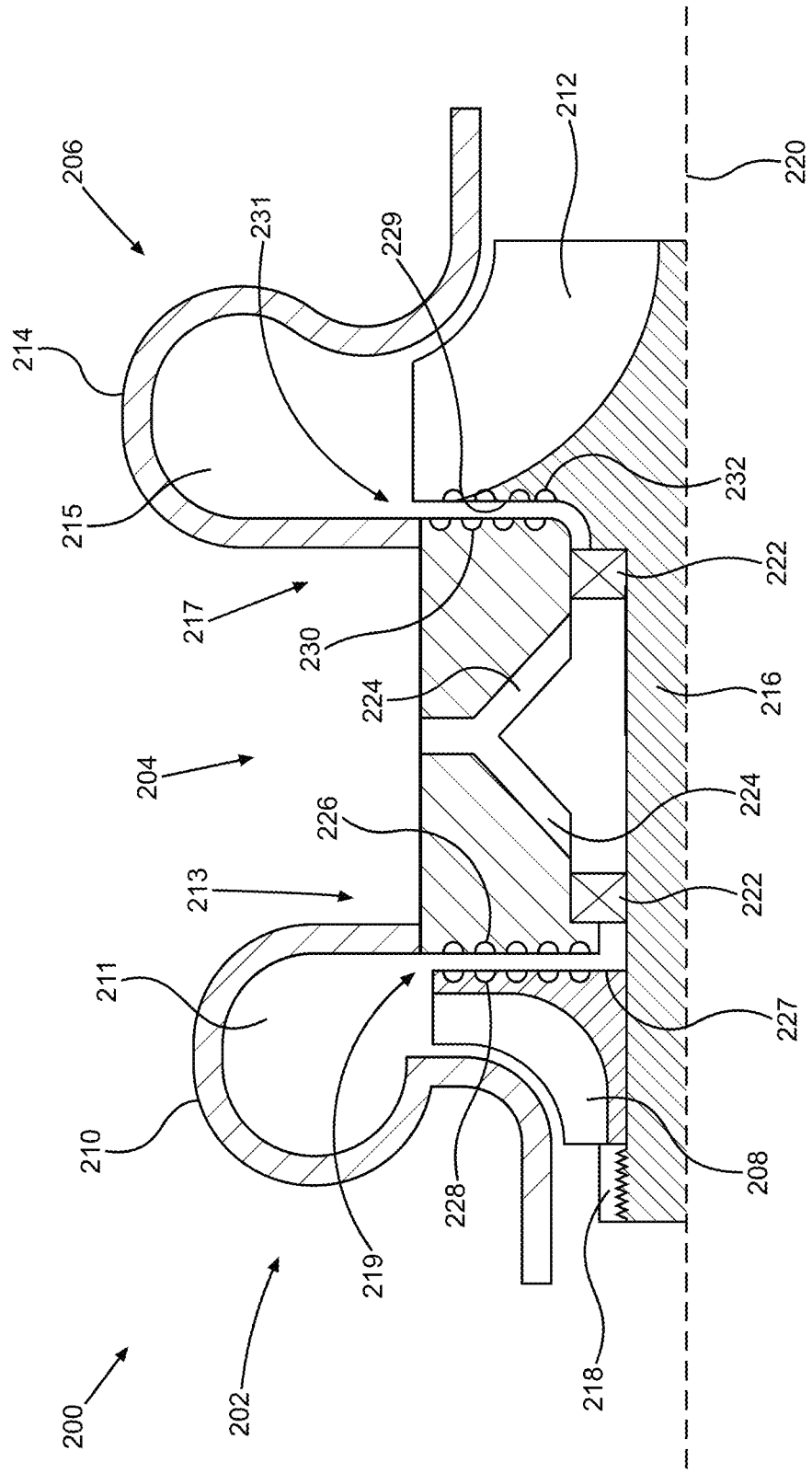
FIG. 16 is a schematic cross-sectional side view of a first embodiment of a turbocharger.

Another specific application of the seal assembly 2 is shown in FIG. 16, which depicts a schematic cross-sectional view of a turbocharger 200. The turbocharger 200 comprises a compressor 202, a bearing housing 204 and a turbine 206. The compressor 202 comprises a compressor wheel 208, and a compressor housing 210. The compressor housing 210 defines a compressor volute 211. The compressor wheel 208 comprises a back face 227 positioned opposite a compressor end 213 of the bearing housing 204 so as to define a compressor leakage passage 219 therebetween. The turbine 206 comprises a turbine wheel 212 and a turbine housing 214. The turbine housing 214 defines a turbine volute 215. The turbine wheel 221 comprises a back face 229 positioned opposite a turbine end 217 of the bearing housing 204 so as to define a turbine leakage passage 231 therebetween. It will be appreciated that the compressor 202 and the turbine 206 are each an example of an impeller assembly. In particular, the compressor wheel 208 and the turbine wheel 212 are examples of impeller wheels.

The turbine wheel 212 is integrally formed with a turbocharger shaft 216 which extends through the bearing housing 204 to the compressor 202. The compressor wheel 208 is mounted to an opposite end of the turbocharger shaft 216 to the turbine wheel 212 and is held in place by a compressor nut 218. The turbocharger shaft 216 is supported for rotation about a turbocharger axis 220 by a pair of bearings 222 disposed in the bearing housing 204. During use exhaust gas from an internal combustion engine (not shown) is fed to the turbine 206 which causes the turbine wheel 212 to spin, thus driving the compressor wheel 218. The compressor wheel 218 compresses air so that it is at a pressure above atmospheric pressure, and the compressed air is fed to the intake of the internal combustion engine so as to increase the power output of the internal combustion engine, as would be known to a person skilled in the art.

The bearing housing comprises lubrication channels 224 which feed lubricant to the bearings 222. This reduces the friction experienced by the turbocharger shaft 216 as it rotates, and improves power transmission from the turbine wheel 212 to the compressor wheel 218 (i.e. by reducing frictional losses). In general, the pressure of the intake air in the compressor volute 211 will be higher than the pressure within the bearing housing 204. As such, fluid from the compressor volute 211 will leak into the bearing housing 204 via the compressor leakage passage 219. Likewise, the pressure of the exhaust gas in the turbine volute 215 will be higher than the pressure within the bearing housing 204 and therefore fluid from the turbine volute 215 will leak into the bearing housing 204 via the turbine leakage passage 231. However, under some operating conditions the pressure in the one of the compressor or turbine volutes 211, 215 may be substantially higher than the other. In such circumstances, the fluid pressure from the higher pressure volute can be transferred through the beating housing 204 to the lower pressure volute. It is therefore possible for lubricating fluid to flow from the bearing housing 204 and into the compressor or turbine volutes 211, 215 where it can be problematic for operation of the turbocharger 200, the engine, or any aftertreatment systems.

In order to solve this problem, the compressor end 213 of the bearing housing 204 comprises a plurality of recesses 226 positioned behind the back face 227 of the compressor wheel 208. The recesses 226 of the compressor end 213 of the bearing housing 204 extend circumferentially around the turbocharger axis 220 and are arranged concentrically to one another. Additionally, the back face 227 of the compressor wheel 208 comprises a corresponding series of recesses 228. The recesses 228 of the back face 227 of the compressor wheel 208 extend circumferentially around the turbocharger axis 220 and are arranged concentrically to one another. During use, compressed air which leaks from the compressor volute 211 into compressor leakage passage 219 will be disrupted by the presence of the recesses 226, 228 of the compressor wheel 208 and the compressor end 213 of the bearing housing 204. The recesses 226, 228 will cause the air within the compressor leakage passage 219 to become turbulent, leading to the formation of vortices and causing the air to lose energy (as explained above in relation to the seal assembly 2). As such, the recesses 226, 228 form act to impede fluid flow through the compressor leakage passage 219. Because the compressor wheel 208 and the compressor end 213 of the bearing housing 204 comprise recesses 226, 228, it will be appreciated that the compressor wheel 208 and the compressor end 213 of the bearing housing 204 correspond to the first component 8 and/or second component 10 of the seal assembly 2 described above.

Likewise, the turbine end 217 of the bearing housing 204 comprises a plurality of recesses 230 positioned behind the back face 229 of the turbine wheel 212, and the back face 229 of the turbine wheel 212 comprises a plurality of recesses 232. The recesses 230, 232 of the turbine end 217 of the bearing housing 204 and the turbine wheel 212 extend circumferentially around the turbocharger axis 220 and are arranged concentrically to one another. The recesses 230, 232 of the turbine housing 214 and the turbine wheel 212 will cause vortex formation in any fluid that flows through the turbine leakage passage 231, which will impede fluid leakage from through the turbine leakage passage 231. Because the turbine wheel 212 and the turbine end 217 of the bearing housing 204 comprise recesses 230, 232, it will be appreciated that the turbine wheel 212 and the turbine end 217 of the bearing housing correspond to the first component 8 and/or second component 10 of the seal assembly 2 described above.

In alternative embodiments, the recesses 226, 228, 230, 232 may be arranged so that they are directed radially outwards from the turbocharger axis 220. Additionally or alternatively, the recesses 226, 228, 230, 232 may be arranged so that they are spirals extending outwardly from the turbocharger axis 220, or may be a plurality of dimples. It will be appreciated that any component of the compressor 202 which defines at least a portion of the compressor leakage passage 219 and any component of the turbine 206 which defines at least a portion of the turbine leakage passage 231 may comprise recesses configured to generate vortices. For example, the compressor housing 210, turbine housing 214, and/or bearing housing 204 may comprise recesses and may therefore correspond to the first component 8 and/or the second component 10 of the seal assembly 2.

Figure 17:
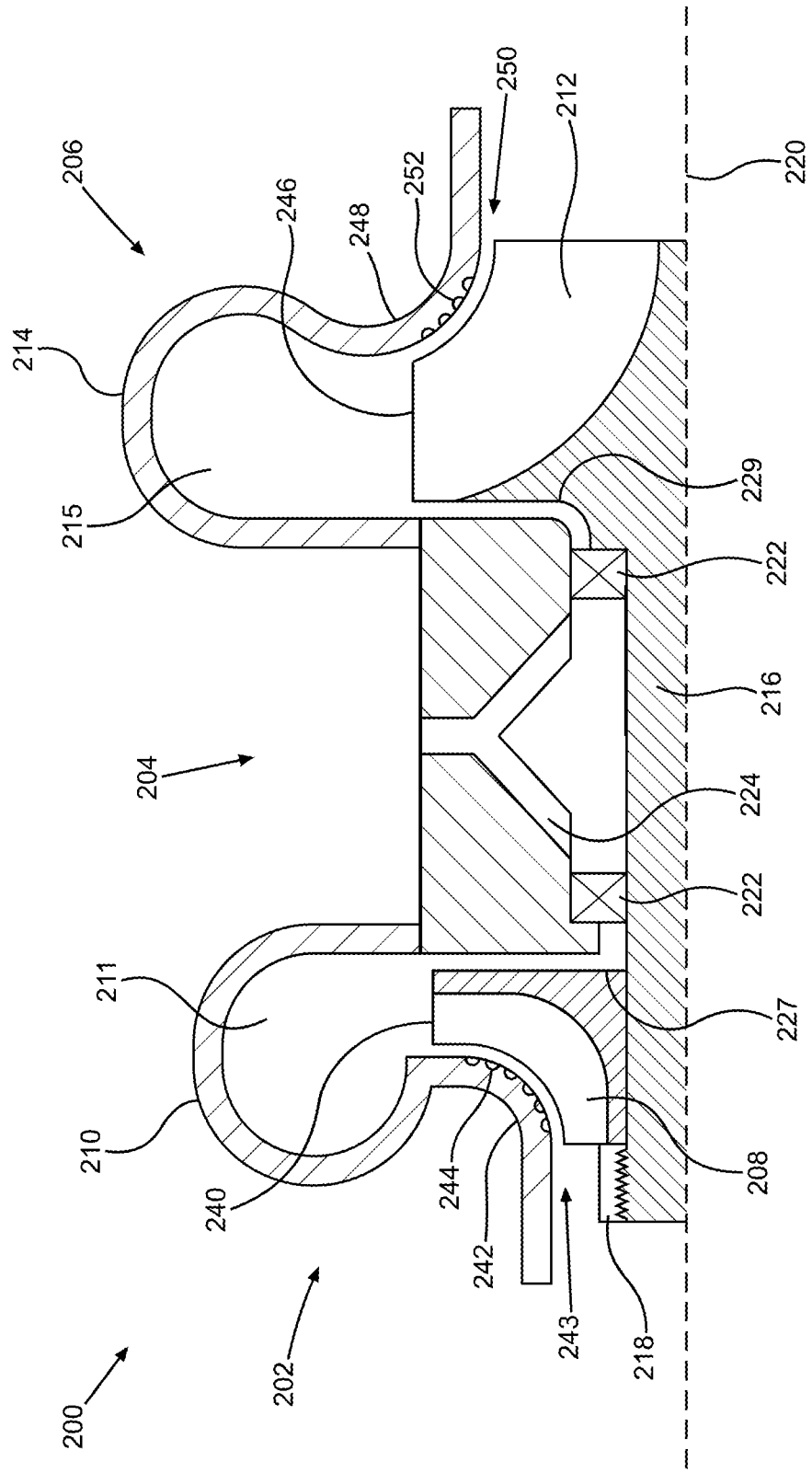
FIG. 17 is a schematic cross-sectional side view of a second embodiment of a turbocharger.

FIG. 17 discloses another embodiment of a turbocharger 200. The compressor wheel 208 comprises a plurality of compressor blades 240. The compressor blades define a generally curved axial cross-section such that incoming air enters the compressor 202 in an axial direction exits in a radially outward direction. That is to say, the curved cross-section is defined between an inducer portion and an exducer portion of the compressor wheel 208. The compressor housing 210 comprises a curved profile 242 that closely conforms to the cross-axial cross-section of the compressor blades 240. So that the compressor wheel 208 is rotatable relative to the compressor housing 210, a clearance 243 is present between the compressor blades 240 and the curved profile 242 of the compressor housing 210. Often, air passing through the compressor is able to pass through the clearance 243. Air passing through the clearance 243 will not be compressed as much as the air passing through the compressor wheel 208, and thus the efficiency of the compressor 202 will be reduced.

However, as shown in FIG. 17 the curved profile 242 of the compressor housing 210 comprises a plurality of recesses 244. The recesses 244 extend circumferentially around the turbocharger axis 220 and are arranged concentrically to one another. However, in alternative embodiments the recesses 244 may extend parallel to the turbocharger axis 220 or may be spiral shaped or may be a plurality of dimples. The recesses generate turbulence in the clearance 243 which acts to impede air flow through the clearance 243 and thereby increase the efficiency of the compressor 202.

Likewise, the turbine wheel 212 comprises a plurality of turbine blades 246 separated from a curved profile 248 of the turbine housing 214 by a clearance 250. During use, a portion of the exhaust gas can pass through the clearance 250, thus reducing the efficiency of the turbine 206 as this portion of the exhaust gas does not impart any energy on the turbine blades 246. To solve this problem, the curved profile 248 of the turbine housing 214 comprises a plurality of recesses 252, which may be the same as the recesses 244 of the compressor 202. The recesses 252 of the turbine 206 cause turbulent flow in the clearance 250 of the turbine 202 thus reducing leakage through the clearance 250 and improving the efficiency of the turbine 202 in the same way as described above for the compressor 202.

Figure 18:
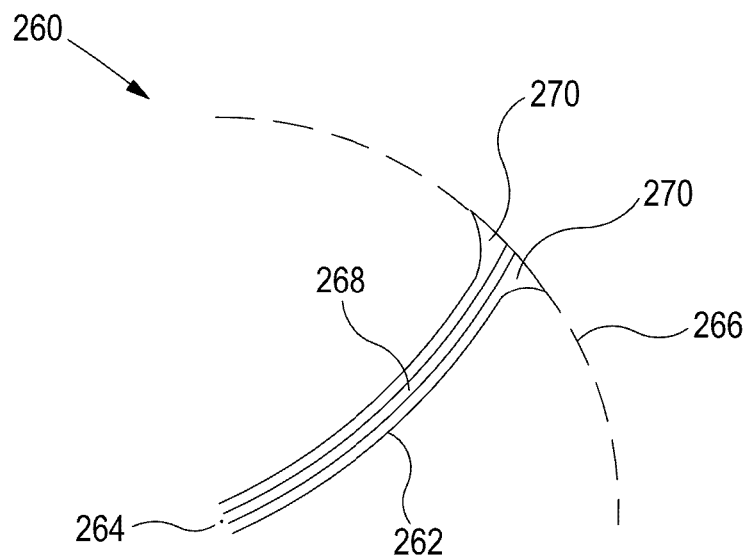
FIG. 18 is a schematic front view of a portion of an impeller wheel.

FIG. 18 shows a front view of a portion impeller wheel 260 for use as the compressor wheel 208 or the turbine wheel 212 of the turbocharger 200. The impeller wheel 260 comprises a plurality of impeller blades 262 extending generally radially outwards from an impeller axis 264 to an impeller circumference 266. For clarity, only one impeller blade 262 is shown in FIG. 18. The impeller blades 262 comprise recesses 268 which extend along the tips of the impeller blades generally from the impeller axis 264 to the impeller circumference 266. As such, it will be appreciated that the tips of the impeller blades 262 may comprise the first component 8 and/or the second component 10 of the seal assembly 2.

As discussed above in relation to FIG. 17, during use some fluid may leak through the region of space between the compressor blades 240 and the compressor housing 210 or between the turbine blades 246 and the turbine housing 214. This leakage means that less energy is imparted on the fluid by the compressor wheel 208 and less energy is imparted on the turbine wheel 212 by the fluid passing through the turbine 206. However, if the impeller wheel 260 of FIG. 18 is used for the compressor wheel 208 and/or the turbine wheel 212, the recesses 268 of the impeller wheel will cause turbulence in the regions of space through which fluid leaks, this impeding fluid leakage and improving the performance of the compressor 202 and/or the turbine 206.

The radially outermost part of the impeller blades 262 further comprise a pair of winglets 270 extending away from the recesses 268 in a generally circumferential direction. The winglets 270 increase the surface area over which fluid must flow in order to leak out over the radially outer ends of the blades 262. As such, the winglets 270 act to further impede leakage.

It will be appreciated that the above described embodiments of the turbocharger 200 may be combined to impede leakage from behind the compressor wheel 208 and/or turbine wheel 212 and to impede leakage over the tips of the compressor blades 240 and/or turbine blades 246.

Figure 19:
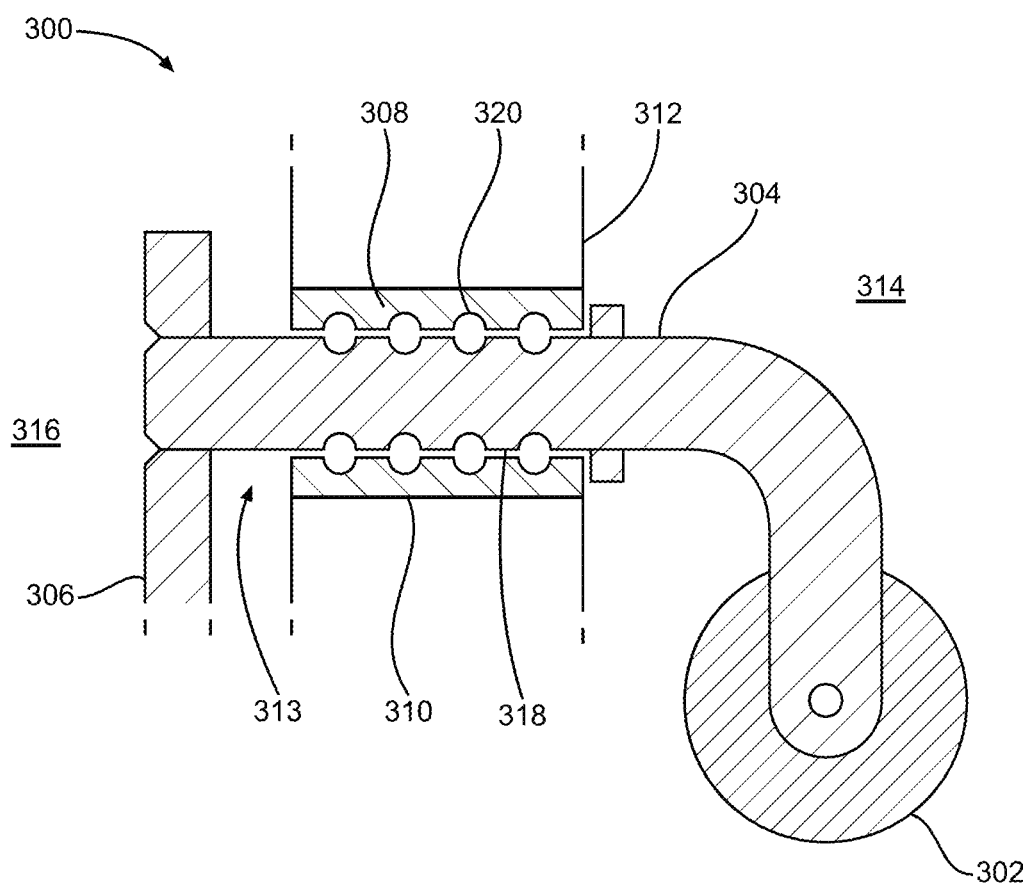
FIG. 19 is a schematic cross-sectional view of a wastegate assembly for a turbine.

It will be appreciated that the seal assembly 2 may be applied in any application where there is a pressure differential across a gap defined between two relatively moving components. One such example is depicted in FIG. 19, which shows a schematic cross-sectional view of a wastegate assembly 300 for a turbine. The wastegate assembly 300 comprises a wastegate valve member 302, a wastegate shaft 304, and an actuator linkage 306. The wastegate shaft 304 passes through a bush 308 held securely within a bore 310 of a turbine housing 312. The outer diameter of the wastegate shaft 304 fits tightly against but is slightly narrower than the inner diameter of the bush 310 so as to leave a clearance 313 therebetween. The clearance 313 allows the wastegate shaft 304 to rotate relative to the bush 308. The turbine housing 312 defines an interior side 314 and an exterior side 316. The interior side 314 contains high temperature and pressure exhaust gas, and the exterior side 316 is open to atmosphere.

During use, the actuator linkage exerts a torsional force upon the wastegate shaft 304 to cause the wastegate shaft 304 to rotate relative to the bush 308 and the turbine housing 312. This causes the wastegate valve member 302 to cover or uncover a wastegate passage (not shown) which permits exhaust gas to vent from a position upstream of a turbine wheel to a position downstream of the turbine wheel without passing through the turbine wheel. In this way, the wastegate assembly 300 can be used to control the amount of rotational energy produced by the turbine wheel.

However, because the pressure of the exhaust gas on the interior side 314 of the turbine housing 312 is higher than the atmospheric pressure the air on the exterior side 316 of the turbine housing 312, exhaust gas will leak through the clearance 313 between the wastegate shaft 304 and the bush 308. The leaked exhaust gas will not pass through the exhaust gas aftertreatment system, and is therefore potentially harmful to the environment. In order to solve this problem, the wastegate shaft 304 comprises a plurality of circumferentially extending groves 318 axially spaced apart from one another along the shaft 304, and the bush 308 comprises a corresponding plurality of circumferentially extending grooves 320 axially spaced apart from one another along the bush 308. The corresponding sets of grooves 318, 320 cause the formation of vortices within the exhaust gas flowing through the clearance 313, which acts to impede the flow of exhaust gas from the interior side 314 to the exterior side 316 of the turbine housing 312. It is advantageous for the grooves 318, 320 to be arranged circumferentially so that the exhaust gas leaking through the clearance 313 will pass over each of the grooves 318, 320 in series.

Because the wastegate shaft 304 comprises grooves 318 and the bush 308 comprises grooves 320, the wastegate shaft 304 and the bush 308 may be considered to correspond to the first component 8 and/or the second component 10 of the seal assembly 2. It will be appreciated that in alternative embodiments, the bush 308 may not be present, and therefore the turbine housing 312 may comprise a plurality of grooves configured to generate vortices. In such embodiments, the turbine housing 312 may be considered to correspond to the first component 8 and/or the second component 10 of the seal assembly 2. It will be appreciated that the wastegate shaft 304, the bush 308, and/or the turbine housing 312 may comprise substantially any suitable geometry for the grooves 318, 320, such as those discussed above in relation to the seal assembly 2. For example, the wastegate shaft 304 may comprise a plurality of dimples, and the bush 308 may comprise grooves 320, or vice versa.

In some embodiments, the wastegate assembly 300 may additionally comprise one or more sealing elements (e.g. O-rings or piston rings) to create a contact seal between the wastegate shaft 304 and the turbine housing 312 and/or bush 308. In such embodiments, the grooves 318, 320 provide the advantage that the wastegate assembly is still able to impede leakage through the clearance 313 in the event that the sealing elements break. As such, the grooves 318, 320 may be used as a back-up or auxiliary sealing means.

Figure 20:
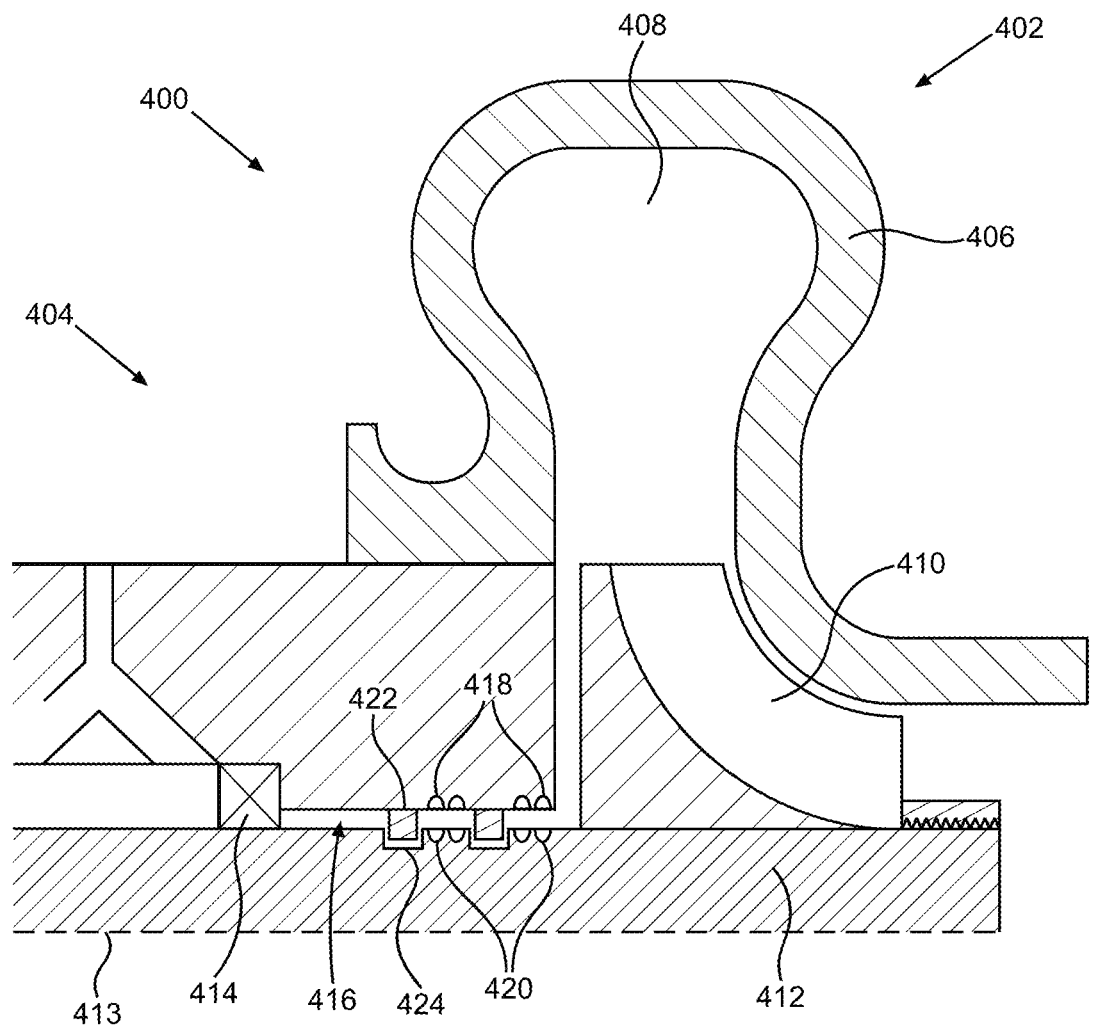
FIG. 20 is a schematic cross-sectional view of a portion of a turbine.

FIG. 20 shows a further application of the seal assembly 2. In particular, FIG. 20 shows a turbocharger 400 comprising a turbine 402 and a bearing housing 404. The turbine 402 comprises a turbine housing 406 defining an inlet volute 408. The turbine 402 further comprises a turbine wheel 410 which is mounted to a turbocharger shaft 412 supported for rotation about a turbocharger axis 413 by bearings 414. In order to permit the turbocharger shaft 412 to rotate relative to the bearing housing 404, the shaft 412 and the bearing housing 404 define a clearance 416 therebetween.

As described above, during use the pressure of the air in the bearing housing 404 will be less than the pressure of the fluid in the inlet volute 408, and therefore during use some exhaust gas will leak from the inlet volute 408 through the clearance 416 and into the bearing housing 404, reducing the efficiency of the turbine 402. In order to solve this problem, the bearing housing 404 comprises a plurality of circumferentially extending grooves 418 spaced axially along the turbocharger axis 413, and the turbocharger shaft 412 comprises a plurality of circumferentially extending grooves 420 spaced axially along the turbocharger axis 413. The presence of the grooves 418, 420 will cause turbulence and vortex formation within the fluid passing through the clearance 416, thus impeding leakage from the inlet volute 408 to the bearing housing 404.

In addition, the turbocharger 400 comprises a pair of circumferential sealing elements 422 which are received within sealing element grooves 424 of the turbocharger shaft 412. The grooves 418 of the bearing housing 404 and the grooves 420 of the turbocharger shaft 412 provide the advantage that they further impede any fluid leakage through the clearance 413, and provide a back-up sealing means in the event of failure of the sealing elements 422.

It will be appreciated that because the bearing housing 404 comprises the plurality of circumferentially extending grooves 418 and the turbocharger shaft 412 comprises the plurality of circumferentially extending grooves 420, the bearing housing 404 and the turbocharger shaft 412 may be considered to correspond to the first component 8 and/or the second component 10 of the seal assembly 2.

Figure 21:
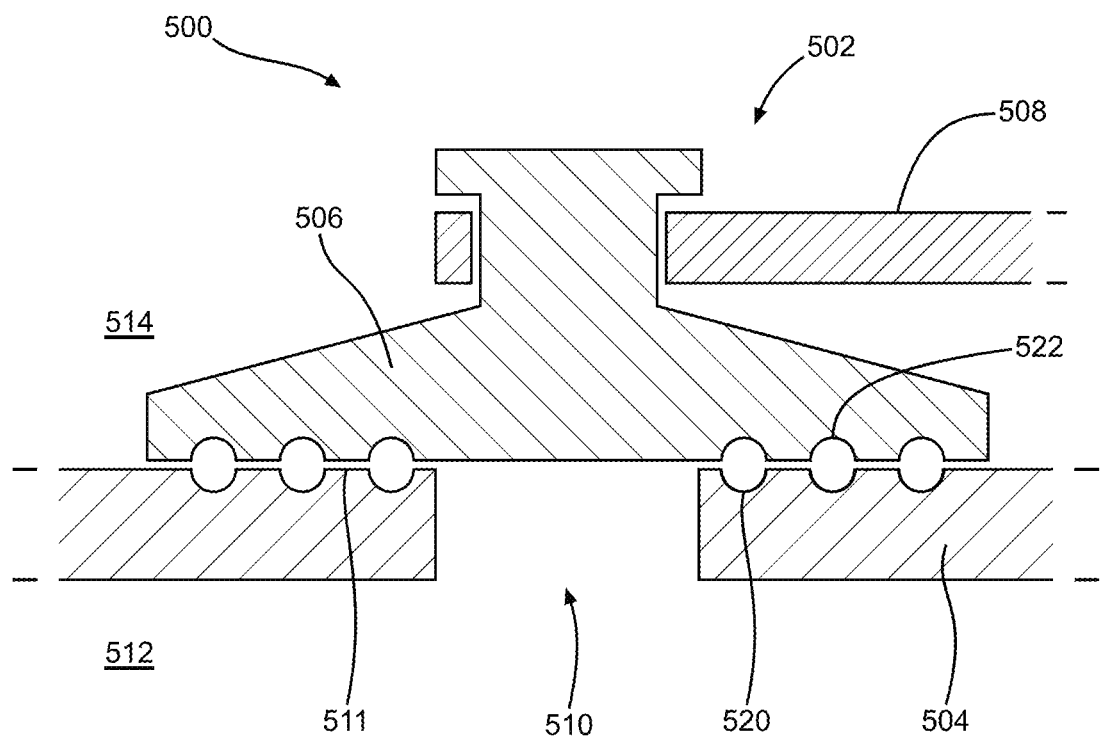
FIG. 21 is a schematic cross-sectional side view of a wastegate assembly for a turbine.

FIG. 21 shows a cross-sectional side view of a turbine 500. The turbine 500 comprises a wastegate assembly 502 and a turbine housing 504. The wastegate assembly 502 comprises wastegate valve member 506 and a wastegate actuator 508. The turbine housing 504 defines a wastegate passage 510 and a valve seat 511. During use, the wastegate valve member 506 contacts the valve seat 511 so that it covers the wastegate passage 510 to prevent fluid flowing through the wastegate passage. The wastegate valve member 506 can be lifted out of contact from the valve seat 511 by the wastegate actuator 508 to selectively permit exhaust gas to flow from an upstream side 512 of the wastegate passage 510 to a downstream side 514 of the wastegate passage so as to bypass a turbine wheel (not shown).

The pressure of the exhaust gas on the upstream side 512 of the wastegate passage 510 is generally higher than the pressure of the exhaust gas on the downstream side 514 of the wastegate passage. Although the wastegate valve member 506 contacts the valve seat 511, some exhaust gas may leak between the wastegate valve member 506 and the valve seat 511. The leaked exhaust gas will not pass through the turbine wheel, and therefore no energy is extracted from the leaked exhaust gas, decreasing the efficiency of the turbine 500.

In order to solve this problem, the valve seal 511 comprises a plurality of circumferentially extending grooves 520 and the wastegate valve member 506 comprises a corresponding set of circumferentially extending grooves 522. During use, the grooves 520, 522 will cause turbulence in the fluid that leaks between the wastegate valve member 506 and the valve seat 511 and will impede the flow of leaked fluid, thus reducing the overall leakage. Furthermore, the grooves 520, 522 also act to impede leakage where the wastegate valve member 506 is open by a relatively small amount, which is advantageous when opening and closing the wastegate assembly 502.

Because the wastegate valve member 506 comprises grooves 522 and because the valve seat 511 of the turbine housing 504 comprises grooves 520, the wastegate valve member 506 and the turbine housing 504 may be considered to correspond to the first component 8 and/or the second component 10 of the seal assembly 2.

Figure 22:
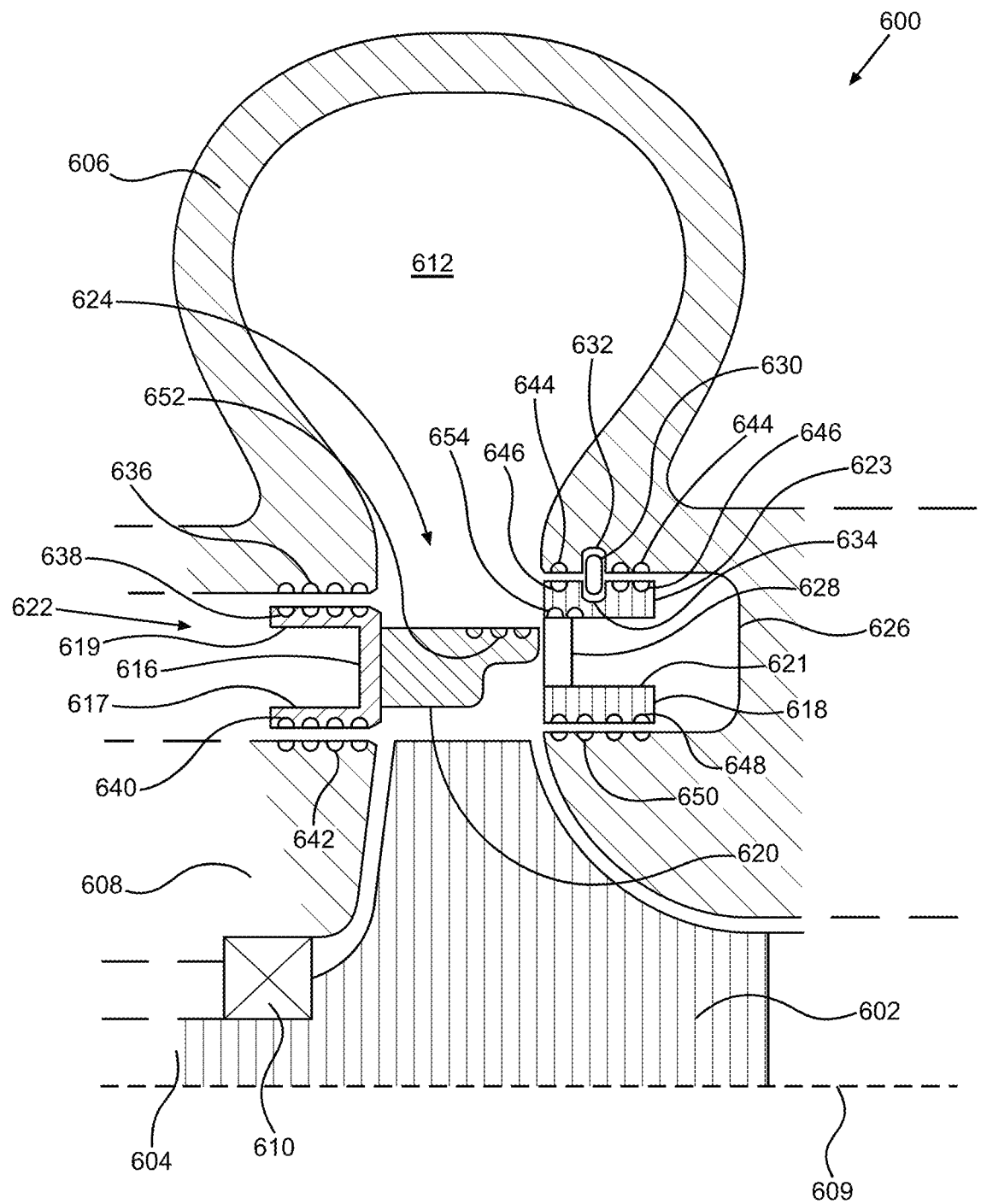
FIG. 22 is a schematic cross-sectional side view of a portion of a variable geometry turbine.

FIG. 22 shows a schematic cross-sectional side view of a portion of a variable geometry turbine 600 which may form part of a turbocharger. The variable geometry turbine comprises a turbine wheel 602, a turbine shaft 604, a turbine housing 606 and a bearing housing 608. The turbine wheel 602 is supported for rotation within the turbine housing 606 about a turbine axis 609 by the turbine shaft 604. The turbine shaft 604 extends through the bearing housing 608 and is supported for rotation by bearings 610. The turbine housing 606 defines an inlet volute 612 which receives air, for example, from the outlet of an internal combustion engine (not shown).

The turbine 600 further comprises a variable geometry mechanism 614 having a nozzle ring 616 and a shroud 618. The nozzle ring 616 defines a generally U-shaped cross-section having an inner wall 617 and an outer wall 619. The nozzle ring 616 comprises a plurality of nozzle vanes 620 (of which only one is shown) circumferentially spaced about the turbine axis 609. The nozzle ring 616 is disposed within an annular nozzle ring passage 622 formed between the turbine housing 606 and the bearing housing 608. The nozzle ring 616 is movable along the turbine axis 609 by an actuation mechanism (not shown) which may be positioned within the bearing housing 608. The nozzle vanes 620 extend along the turbine axis 609 and across an annular inlet passage 624 positioned upstream of the turbine wheel 602 and downstream of the inlet volute 612.

The shroud 618 is fixedly positioned within a shroud cavity 626 defined by the turbine housing 606 such that the shroud 618 is positioned opposite the nozzle ring 616 along the turbine axis 609. The shroud 618 is generally U-shaped and comprises an inner wall 621 and an outer wall 623. The shroud 618 is prevented from moving axially by a circlip 630 received between a circumferential groove 632 of the turbine housing 606 and a corresponding groove 634 of the outer wall 623. The shroud 618 comprises a plurality of apertures 628 which receive the nozzle vanes 620 of the nozzle ring 616. During use, the nozzle ring 616 is moved along the turbine axis 609 to vary the width of the inlet passage 624 and thereby control the flow of fluid to the turbine wheel 602.

It has been found that fluid from the inlet volute 612 is able to leak into the bearing housing 608 via the nozzle ring passage 622, which is detrimental to the efficiency of the turbine 600. The turbine housing 606 therefore comprises a plurality of circumferentially extending grooves 636 and the outer wall 619 of the nozzle ring 616 comprises a plurality of circumferentially extending grooves 638. The grooves 636, 638 lead to the formation of vortices which impedes fluid flow through the nozzle ring passage 622. As such, the turbine housing 606 and the outer wall 619 of the nozzle ring 616 may be considered to define the first component 8 and/or second component 10 of the seal assembly 2. Likewise, the inner wall 617 of the nozzle ring 616 also comprises a plurality of circumferentially extending grooves 640 and the bearing housing 608 comprises a corresponding plurality of circumferentially extending grooves 642. The grooves 640, 642 of the inner wall 617 and bearing housing 608 create vortices so as to impede flow through the nozzle ring passage 622. As such, the inner wall 617 of the nozzle ring 616 and the bearing housing 608 may be considered to define the first component 8 and/or second component 10 of the seal assembly 2.

Fluid may also leak between the shroud 618 and the turbine housing 606 into and/or out of the shroud cavity 626. As such, the turbine housing 606 comprises a plurality of circumferentially extending grooves 644 and the outer wall 623 of the shroud 618 comprises a corresponding plurality of circumferentially extending grooves 646 which generate vortices to impede fluid flow therebetween. The turbine housing 606 and the outer wall 623 of the shroud 618 may be considered to define the first component 8 and/or second component 10 of the seal assembly 2. Likewise, the inner wall 621 of the shroud 618 comprises a plurality of circumferentially extending grooves 648 and the turbine housing 606 comprises a corresponding plurality of circumferentially extending grooves 650 which generate vortices to impede fluid flow therebetween. The inner wall 621 of the shroud 618 and the turbine housing 606 may therefore be considered to define the first component 8 and/or the second component 10 of the seal assembly 2.

Fluid may leak between the nozzle vanes 620 and the apertures 628 of the shroud 618. As such, the nozzle vanes 620 may comprise one or more grooves 652 and the aperture 628 may comprise one or more corresponding grooves 654 configured to generate vortices so as to impeded fluid flow therebetween. The grooves 652 of the nozzle vanes 620 may extend around the entire perimeter of the nozzle vanes 602, or may be positioned in localised groups, such as for example at the leading edge and/or the training edge of the nozzle vanes 620. The nozzle vanes 620 and the apertures 628 of the shroud 618 may therefore be considered to define the first component 8 and/or the second component 10 of the seal assembly 2.

It has been found that during use when the nozzle vanes 620 are received within the apertures 628, some fluid may leak between the leading edge of the nozzle vanes 620 and the apertures 628 into the shroud cavity 626, over the tips of the nozzle vanes 620 and then out of the shroud cavity 626 between the inner wall 621 of the shroud and the turbine housing 606. This leakage detrimentally affects the performance of the turbine and the leaked fluid does not pass between the nozzle vanes 620 and therefore is not conditioned at the correct pressure, velocity and angle relative to the turbine wheel 602. However, the variable geometry turbine 600 avoids this problem due to the presence of the grooves 652 of the nozzle vanes 620 and the grooves 654 of the apertures 628 of the shroud 618, and the grooves 648 of the inner wall 621 of the shroud 618 and the grooves 650 of the turbine housing 606 act to impede fluid flow and thus reduce leakage along this leakage path.

It will be appreciated that the grooves discussed above in relation to the variable geometry turbine 600 may have substantially any suitable geometry as previously discussed in relation to the seal assembly 2 (including for example dimpled geometries). Although the variable geometry turbine 600 described above comprises nozzle ring 616 that is axially movable, it will be appreciated that the seal assembly 2 could be used to provide improved sealing in substantially any variable geometry turbine, such as for example a swing-vane variable geometry turbine. Alternatively, the shroud 618 may be movable along the turbine axis 609 and the nozzle ring 616 may be axially fixed. It will be appreciated that the variable geometry turbine 600 need not comprise all of the corresponding pluralities of grooves described above for reducing leakage. In particular, the turbine 600 may be configured so that leakage is only reduced between the nozzle ring 616 and the turbine housing 606 or the bearing housing 608, between the shroud 618 and the turbine housing 606, and/or between the nozzle vanes 620 and the apertures 628.

In general, throughout this disclosure it will be appreciated that the features of any of the above described embodiments may be combined with any of the other described embodiments.

The invention claimed is:

1. A valve comprising:
a housing defining a valve chamber defining a longitudinal axis, an inlet adjoining the valve chamber, a primary outlet adjoining the valve chamber, and;
a valve member disposed within the valve chamber and supported for rotation about a longitudinal axis of the valve chamber, the valve member and the housing defining a clearance therebetween; and
a seal assembly comprising a first component and a second component spaced apart from the first component so as to define a passage for the transfer of fluid from an inlet of the seal assembly to an outlet of the seal assembly,
wherein:
the first component comprises a concavity at least partially defining the passage, and wherein no part of the second component extends into the portion of the passage bounded by the concavity,
the housing comprises one of the first component of the seal assembly and the second component of the seal assembly,
the valve member comprises the other of the first component of the seal assembly and the second component of the seal assembly,
the clearance comprises the passage of the seal assembly,
the valve further comprises a secondary outlet adjoining the valve chamber, the valve member comprises:
a first end wall positioned at a first longitudinal end of the valve member,
a second end wall positioned at a second longitudinal end of the valve member opposite the first end wall of the valve member, and
a web extending between the first and second end walls, and
the first end wall is received by a first end cap having a first longitudinally extending shaft, and wherein the second end wall is received by a second end cap having a second longitudinally extending shaft, the shafts being aligned with the longitudinal axis of the housing and being configured to support the valve member for rotation within the valve chamber.

2. The valve according to claim 1, wherein the first component and the second component are movable relative to one another.

3. The valve according to claim 2, wherein the seal assembly defines a direction of fluid flow from the inlet to the outlet, and wherein the first and second components are moveable relative to one another generally parallel to the direction of fluid flow.

4. The valve according to claim 1, wherein the concavity defines a depth and the first and second components define a clearance, and wherein a ratio of the depth of the concavity to the clearance between the first and second components is at least 3:1.

5. The valve according to claim 1, wherein the concavity defines an elongate recess.

6. The valve according to claim 1, wherein the concavity smoothly transitions between a minimum depth and a maximum depth.

7. The valve according to claim 1, wherein:
the concavity defines a depth;
the first component and the second component define a minimum clearance therebetween; and
a ratio of the depth of the concavity to the minimum clearance between the first component and the second component is in the range of 2.5:1 to 3.75:1.

8. The valve according to claim 1, wherein:
the passage defines a length, and
a ratio of the length of the passage to the depth of the concavity is at least 20:1.

9. The valve according to claim 1, wherein the concavity defines a surface roughness in the range of 10 µm to 50 µm.

10. The valve according to claim 1, wherein the second component comprises a concavity at least partially defining the passage, and wherein no part of the first component extends into the portion of the passage bounded by the concavity of the second component.

11. The valve according to claim 10, wherein the concavity of the first component defines a first depth and wherein the concavity of the second component defines a second depth, and wherein the first depth is different to the second depth.

12. The valve according to claim 1, wherein the second component comprises a plurality of concavities at least partially defining the passage.

13. The valve according to claim 1, wherein the web comprises the first component, and wherein the concavity of the first component is defined by an outer surface of the web.

14. The valve according to claim 1, wherein the inlet, the primary outlet and the secondary outlet define a plane, and wherein the longitudinal axis extends transverse to the plane.

15. The valve according to claim 1, wherein the valve is a rotary turbine control valve for use with a turbine.

16. A valve comprising:
a housing defining a valve chamber defining a longitudinal axis, an inlet adjoining the valve chamber, a primary outlet adjoining the valve chamber, and;
a valve member disposed within the valve chamber and supported for rotation about a longitudinal axis of the valve chamber, the valve member and the housing defining a clearance therebetween; and
a seal assembly comprising a first component and a second component spaced apart from the first component so as to define a passage for the transfer of fluid from an inlet of the seal assembly to an outlet of the seal assembly,
wherein:
the first component comprises a concavity at least partially defining the passage, and wherein no part of the second component extends into the portion of the passage bounded by the concavity,
the housing comprises one of the first component of the seal assembly and the second component of the seal assembly,
the valve member comprises the other of the first component of the seal assembly and the second component of the seal assembly,
the clearance comprises the passage of the seal assembly, and
the housing comprises a sleeve and wherein the sleeve comprises the first component.

17. The valve according to claim 16, wherein the valve comprises an inner housing between the housing and the sleeve, the inner housing and the valve member at least partially forming a cartridge received by the housing.

18. The valve according to claim 16, wherein the first component and the second component are movable relative to one another.

19. The valve according to claim 18, wherein the seal assembly defines a direction of fluid flow from the inlet to the outlet, and wherein the first and second components are moveable relative to one another generally parallel to the direction of fluid flow.

20. The valve according to claim 16, wherein the concavity defines a depth and the first and second components define a clearance, and wherein a ratio of the depth of the concavity to the clearance between the first and second components is at least 3:1.

21. The valve according to claim 16, wherein the concavity defines an elongate recess.

22. The valve according to claim 16, wherein the concavity smoothly transitions between a minimum depth and a maximum depth.

23. The valve according to claim 16, wherein:
the concavity defines a depth;
the first component and the second component define a minimum clearance therebetween; and
a ratio of the depth of the concavity to the minimum clearance between the first component and the second component is in the range of 2.5:1 to 3.75:1.

24. The valve according to claim 16, wherein:
the passage defines a length, and
a ratio of the length of the passage to the depth of the concavity is at least 20:1.

25. The valve according to claim 16, wherein the concavity defines a surface roughness in the range of 10 μm to 50 μm.

26. The valve according to claim 16, wherein the second component comprises a concavity at least partially defining the passage, and wherein no part of the first component extends into the portion of the passage bounded by the concavity of the second component.

27. The valve according to claim 26, wherein the concavity of the first component defines a first depth and wherein the concavity of the second component defines a second depth, and wherein the first depth is different to the second depth.

28. The valve according to claim 16, wherein the second component comprises a plurality of concavities at least partially defining the passage.

29. The valve according to claim 16, wherein the valve is a rotary turbine control valve for use with a turbine.

* * * * *